US011896537B2

(12) United States Patent
Beed et al.

(10) Patent No.: US 11,896,537 B2
(45) Date of Patent: Feb. 13, 2024

(54) APPARATUS AND METHOD FOR REORIENTING A PERSON BETWEEN A SUPINE POSITION AND A PRONE POSITION

(71) Applicant: Melior Motus Inc., Halifax (CA)

(72) Inventors: Stephen Douglas Beed, Halifax (CA); Arad Gharagozli, Halifax (CA)

(73) Assignee: MELIOR MOTUS INC., Halifax (CA)

( * ) Notice: Subject to any disclaimer, the term of this patent is extended or adjusted under 35 U.S.C. 154(b) by 0 days.

(21) Appl. No.: 17/662,965

(22) Filed: May 11, 2022

(65) Prior Publication Data

US 2022/0339048 A1 Oct. 27, 2022

Related U.S. Application Data

(63) Continuation of application No. 17/173,838, filed on Feb. 11, 2021, now Pat. No. 11,357,685.
(Continued)

(51) Int. Cl.
*A61G 7/10* (2006.01)

(52) U.S. Cl.
CPC ......... *A61G 7/1036* (2013.01); *A61G 7/1038* (2013.01); *A61G 7/1051* (2013.01);
(Continued)

(58) Field of Classification Search
CPC .. A61G 7/1036; A61G 7/1038; A61G 7/1051; A61G 7/1073; A61G 2200/30;
(Continued)

(56) References Cited

U.S. PATENT DOCUMENTS 2,664,083 A 12/1953 Heymans
2,766,751 A * 10/1956 Topa .................... A61F 5/3784 128/870
(Continued)

FOREIGN PATENT DOCUMENTS

EP 1064902 B1 3/2004
EP 2719365 A1 * 4/2014 ............ A61G 7/001
(Continued)

OTHER PUBLICATIONS

International Search Report and Written Opinion for PCT/CA2021/051524 dated Feb. 4, 2022.

*Primary Examiner* — David R Hare
(74) *Attorney, Agent, or Firm* — Smart & Biggar LP

(57) ABSTRACT

An apparatus for reorienting a person includes a wrap having a first lateral portion and a second lateral portion, the first lateral portion and the second lateral portion being releasably securable to one another along an anterior region of the wrap between lateral sides of the person and along a posterior region of the wrap between the lateral sides of the person via a set of fasteners. Each of the lateral portions are dimensioned to extend around a corresponding one of the lateral sides of the person and having anterior and posterior edges that are dimensioned to extend at most partway across to an opposite one of the lateral sides of the person. The wrap is made from flexible materials and dimensioned to extend at least from below knees of the person to above the elbows of the person and snugly retain the person therein.

20 Claims, 39 Drawing Sheets

Related U.S. Application Data

(60) Provisional application No. 63/198,613, filed on Oct. 29, 2020.

(52) U.S. Cl.
CPC ........ *A61G 7/1073* (2013.01); *A61G 2200/30* (2013.01); *A61G 2200/54* (2013.01); *A61G 2200/60* (2013.01); *A61G 2210/30* (2013.01)

(58) Field of Classification Search
CPC ............ A61G 2200/54; A61G 2200/60; A61G 2210/30
See application file for complete search history.

(56) References Cited

U.S. PATENT DOCUMENTS

| | | | | |
|---|---|---|---|---|
| 2,948,278 | A * | 8/1960 | Topa | A61F 5/3784 128/873 |
| 3,361,132 | A * | 1/1968 | Rentsch, Jr. | A61F 5/3715 2/69 |
| 3,530,851 | A | 9/1970 | Geschickter | |
| 4,092,748 | A * | 6/1978 | Ewers | A61G 7/1074 5/85.1 |
| 4,124,908 | A * | 11/1978 | Burns | A61F 5/3776 5/628 |
| 4,194,253 | A * | 3/1980 | Ullven | A61G 7/1044 5/84.1 |
| 4,742,821 | A | 5/1988 | Wootan | |
| 4,872,226 | A | 10/1989 | Lonardo | |
| 4,970,739 | A | 11/1990 | Bradford | |
| 5,060,324 | A | 10/1991 | Marinberg | |
| 5,068,931 | A * | 12/1991 | Smith | A61G 7/1015 5/84.1 |
| 5,121,514 | A * | 6/1992 | Rosane | A61G 1/01 5/628 |
| 5,165,122 | A * | 11/1992 | Phalen | A61G 7/1026 5/89.1 |
| 5,210,887 | A * | 5/1993 | Kershaw | A61G 7/1046 5/86.1 |
| 5,673,443 | A * | 10/1997 | Marmor | A61G 7/001 5/85.1 |
| 6,212,684 | B1 * | 4/2001 | Waheed | A61F 5/3746 2/108 |
| 6,227,201 | B1 * | 5/2001 | Ferko, III | A61G 1/01 5/628 |
| 7,818,836 | B2 | 10/2010 | Stinson | |
| 8,726,431 | B2 * | 5/2014 | Sverdlik | A61G 7/1015 5/85.1 |
| 9,023,003 | B1 | 5/2015 | Bracci | |
| 2010/0199425 | A1 * | 8/2010 | Lee | A61G 7/1015 5/85.1 |
| 2012/0186013 | A1 | 7/2012 | Ponsi | |
| 2015/0025424 | A1 | 1/2015 | Richardson | |
| 2018/0303690 | A1 | 10/2018 | Hahn et al. | |

FOREIGN PATENT DOCUMENTS

| | | | | |
|---|---|---|---|---|
| EP | 2719365 | A1 | 4/2014 | |
| EP | 3424478 | A1 | 1/2019 | |
| FR | 3092990 | A1 | 8/2020 | |
| GB | 1536191 | A * | 12/1978 | A47G 9/086 |
| GB | 2324738 | A | 11/1998 | |
| KR | 20160104815 | A | 9/2016 | |
| WO | 2018005970 | A1 | 1/2018 | |
| WO | 2019211584 | A1 | 11/2019 | |

* cited by examiner

APPARATUS AND METHOD FOR REORIENTING A PERSON BETWEEN A SUPINE POSITION AND A PRONE POSITION

CROSS-REFERENCE TO RELATED APPLICATIONS

This application is a continuation of U.S. patent application Ser. No. 17/173,838 filed Feb. 11, 2021, which claims the benefit of U.S. Provisional Application No. 63/198,613, filed Oct. 29, 2020, the contents of both of which are incorporated herein by reference in their entirety.

FIELD

The specification relates generally to medical equipment, and, in particular, to an apparatus and method for reorienting and/or at least partially elevating a person.

BACKGROUND OF THE DISCLOSURE

Patients with life threatening health issues may need to be supported by ICU equipment including but not limited to a breathing tube connected to a mechanical ventilator, or other vital monitoring equipment.

In most cases, when a patient is attached to ventilator and or other health support equipment for a long time they need to be sedated or lay down continuously. The sedation or laying down for a long period of time negatively affects the gas exchange in their system. With ongoing life threateningly low levels of oxygen as well as dangerous levels of carbon dioxide in the blood alternative ways to ventilate these patients have been proven useful.

Moving a patient on to their stomach (proning) predictably improves oxygen levels in the blood and allows more efficient ventilation so that carbon dioxide levels decrease. Large studies have shown this approach cuts the mortality rate for these patients in half when used. Recently, with the COVID pandemic, thousands of patients around the world have been admitted to hospitals with severe respiratory failure. Prone ventilation has proven to be particularly effective for these patients. The patients usually go on to their stomach for 16 hr and then are moved back into the supine position for 8 hr with this cycle often repeated for several days.

In spite of the success of this strategy to ventilate patients it has been uncommonly used in ICU's, mostly because the movement of a critically ill, anesthetized patient who is connected to a ventilator and intravenous lines so that medication can be continuously infused, is difficult. It is essentially a "dead lift" of an unstable patient, often obese (>100 Kg) and requires a 5-7 person team. This is a physically demanding exercise for the healthcare team that can result in strain injuries for healthcare workers. In addition, it can be dangerous for the patient if lines are accidentally removed during the process.

SUMMARY OF THE DISCLOSURE

In one aspect, there is provided an apparatus for reorienting a person, comprising: a wrap having a first lateral portion and a second lateral portion, the first lateral portion and the second lateral portion being releasably securable to one another along an anterior region of the wrap between lateral sides of the person and along a posterior region of the wrap between the lateral sides of the person via a set of fasteners, each of the first lateral portion and the second lateral portion being dimensioned to extend around a corresponding one of the lateral sides of the person and having anterior and posterior edges that are dimensioned to extend at most partway across to an opposite one of the lateral sides of the person, the wrap being made from flexible materials and dimensioned to extend at least from below knees of the person to above the elbows of the person and snugly retain the person therein when the wrap is positioned on the person and the first and second sets of fasteners are secured.

At least one of the first lateral portion and the second lateral portion can include a set of connectors positioned along at least one of the first lateral portion and the second lateral portion, the set of connectors being located along the at least one of the first lateral portion and the second lateral portion from at least adjacent to the knees to at least adjacent to the elbows of the person and being located towards a corresponding one of the lateral sides of the person when the person is retained in the wrap. The set of connectors can include loops. The apparatus can further include a support structure coupled or couplable to a hoist and to the set of connectors to inhibit relative movement of the knees, hips, and shoulders of the person when secured in the wrap and coupled to the hoist.

The support structure can have a set of wrap connectors for coupling to the set of connectors of the wrap retaining a person along a longitudinal axis of the person, the support structure having a set of hoist connectors dimensioned to be couplable to a hoist, the set of hoist connectors enabling coupling of the hoist to the support structure at at least two positions along the longitudinal axis. The support structure can be inflexible to bowing towards the person-retaining structure. The support structure can be a rigid member.

The set of connectors can be a first set of connectors, and wherein a second set of connectors can be positioned along the at least one of the first lateral portion and the second lateral portion further towards one of the anterior joint and the posterior joint relative to the at least one first connector, the support structure being selectively couplable to the at least one first connector or the at least one second connector. The apparatus can further include an expansion portion that is positionable between and couplable to the first lateral portion and the second lateral portion to enlarge the wrap.

The apparatus can further include an expansion portion that is positionable between and couplable to the first lateral portion and the second lateral portion to enlarge the wrap.

At least one of the first lateral portion and the second lateral portion can include a set of handles positioned along at least one of the first lateral portion and the second lateral portion, the set of handles being located towards a corresponding one of the lateral sides of the person when the person is secured in the wrap. The set of handles can be a first set of handles positioned along the first lateral portion, and a second set of handles can be positioned along the second lateral portion and located towards the lateral side of the person covered by the second lateral portion when the person is secured in the wrap.

The first lateral portion and the second lateral portion can be dimensioned to position the anterior joint towards one of the lateral sides of the person when the wrap is secured on the person.

At least one of the first lateral portion and the second lateral portion can include a flap that is openable to expose a posterior side of the person while the wrap remains secured thereon.

The first lateral portion and the second lateral portion can extend between the anterior joint and the posterior joint are substantially laterally inflexible.

In another aspect, there is provided an apparatus for reorienting a person, comprising a support structure having a first set of connectors for connecting to a second set of connectors of a person-retaining structure retaining a person along a longitudinal axis of the person, the support structure having a set of hoist connectors dimensioned to be couplable to a hoist, the set of hoist connectors enabling coupling of the hoist to the support structure at at least two positions along the longitudinal axis.

The person-retaining structure can be a wrap that inhibits relative movement of the knees, hips, and shoulders of a person.

The support structure can be inflexible to bowing towards the person-retaining structure.

The support structure can be a rigid member.

In a further aspect, there is provided a method for reorienting a person, comprising: elevating a first lateral side of a person positioned on a surface; positioning a first lateral portion of a wrap on the surface where the first lateral side of the person was resting before being elevated; resting the first lateral side of the person on the first lateral portion of the wrap; elevating a second lateral side of the person; positioning a second lateral portion of the wrap adjacent to the first lateral portion and coupling the first lateral portion and the second lateral portion, the first lateral portion and the second lateral portion being releasably securable to one another along an anterior region of the wrap between lateral sides of the person and along a posterior region of the wrap between the lateral sides of the person via a set of fasteners, each of the first lateral portion and the second lateral portion being dimensioned to extend around a corresponding one of the lateral sides of the person and having anterior and posterior edges that are dimensioned to extend at most partway across to an opposite one of the lateral sides of the person, the wrap being made from flexible materials and dimensioned to extend at least from below the knees of the person to above the elbows of the person and snugly retain the person therein when the wrap encircles the person and the first and second sets of fasteners are secured; resting the second lateral side of the person on the second lateral portion of the wrap, at least one of the first lateral portion and the second lateral portion having at least one connector located towards one of the lateral sides of the person when the person is retained in the wrap; coupling the wrap to a support structure that is generally inflexible along a longitudinal axis and a hoist via the at least one connector; and operating the hoist to at least partially elevate the at least one of the first lateral portion and the second lateral portion.

The method can include operating the hoist to fully elevate the wrap retaining the person. The method can include repositioning the wrap retaining the person. The method can include lowering the wrap retaining the person once repositioned, and decoupling the support structure from the wrap. The method can include uncoupling the first and second lateral portions along an exposed anterior or posterior side of the person. The method can further include elevating one of the first lateral side of the person; decoupling and removing a corresponding one of the first lateral portion and the second lateral portion; resting the one of the first lateral side and the second lateral side of the person on the surface; elevating the other of the first lateral side and the second lateral side of the person; and removing the remaining one of the first lateral portion and the second lateral portion.

In yet another aspect, there is provided an apparatus for reorienting a person, comprising a wrap being sufficiently flexible to encircle a person from below the knees to the shoulders of the person, and the having at least one fastener for securing the wrap around the person, the wrap being dimensioned to snugly retain the person therein, the wrap including a set of connectors positioned towards a corresponding one of the lateral sides of the person when the person is retained in the wrap, the set of connectors extending from at least adjacent to the knees to at least adjacent to the elbows.

In another aspect, there is provided an apparatus for reorienting a person, comprising: a wrap having a first lateral portion and a second lateral portion, the first lateral portion and the second lateral portion being releasably securable to one another along an anterior region of the wrap between lateral sides of the person and along a posterior region of the wrap between the lateral sides of the person via a set of fasteners, each of the first lateral portion and the second lateral portion being dimensioned to extend around a corresponding one of the lateral sides of the person and having anterior and posterior edges that are dimensioned to extend at most partway across to an opposite one of the lateral sides of the person, the wrap being made from flexible materials and dimensioned to extend at least from below knees of the person to above the elbows of the person and snugly retain the person therein when the wrap is positioned on the person and the first and second sets of fasteners are secured.

At least one of the first lateral portion and the second lateral portion can include a set of connectors positioned along at least one of the first lateral portion and the second lateral portion, the set of connectors being located along the at least one of the first lateral portion and the second lateral portion from at least adjacent to the knees to at least adjacent to the elbows of the person and being located towards a corresponding one of the lateral sides of the person when the person is retained in the wrap. The set of connectors can include loops. The apparatus can further include a support structure coupled or couplable to a hoist and to the set of connectors to inhibit relative movement of the knees, hips, and shoulders of the person when secured in the wrap and coupled to the hoist.

The support structure can have a set of wrap connectors for coupling to the set of connectors of the wrap retaining a person along a longitudinal axis of the person, the support structure having a set of hoist connectors dimensioned to be couplable to a hoist, the set of hoist connectors enabling coupling of the hoist to the support structure at at least two positions along the longitudinal axis. The support structure can be inflexible to bowing towards the person-retaining structure. The support structure can be a rigid member.

The set of connectors can be a first set of connectors, and wherein a second set of connectors can be positioned along the at least one of the first lateral portion and the second lateral portion further towards one of the anterior joint and the posterior joint relative to the at least one first connector, the support structure being selectively couplable to the at least one first connector or the at least one second connector. The apparatus can further include an expansion portion that is positionable between and couplable to the first lateral portion and the second lateral portion to enlarge the wrap.

The apparatus can further include an expansion portion that is positionable between and couplable to the first lateral portion and the second lateral portion to enlarge the wrap.

At least one of the first lateral portion and the second lateral portion can include a set of handles positioned along at least one of the first lateral portion and the second lateral portion, the set of handles being located towards a corresponding one of the lateral sides of the person when the person is secured in the wrap. The set of handles can be a first set of handles positioned along the first lateral portion, and a second set of handles can be positioned along the second lateral portion and located towards the lateral side of the person covered by the second lateral portion when the person is secured in the wrap.

The first lateral portion and the second lateral portion can be dimensioned to position the anterior joint towards one of the lateral sides of the person when the wrap is secured on the person.

At least one of the first lateral portion and the second lateral portion can include a flap that is openable to expose a posterior side of the person while the wrap remains secured thereon.

The first lateral portion and the second lateral portion can extend between the anterior joint and the posterior joint are substantially laterally inflexible.

In still another aspect, there is provided a method for at least partially elevating a person, comprising: elevating a first lateral side of a person positioned on a surface; positioning a first lateral portion of a wrap on the surface where the first lateral side of the person was resting before being elevated; resting the first lateral side of the person on the first lateral portion of the wrap; elevating a second lateral side of the person; positioning a second lateral portion of the wrap adjacent to the first lateral portion and coupling the first lateral portion and the second lateral portion, the first lateral portion and the second lateral portion being releasably securable to one another along an anterior region of the wrap between lateral sides of the person and along a posterior region of the wrap between the lateral sides of the person via a set of fasteners, each of the first lateral portion and the second lateral portion being dimensioned to extend around a corresponding one of the lateral sides of the person and having anterior and posterior edges that are dimensioned to extend at most partway across to an opposite one of the lateral sides of the person, the wrap being made from flexible materials and dimensioned to extend at least from below the knees of the person to above the elbows of the person and snugly retain the person therein when the wrap encircles the person and the first and second sets of fasteners are secured; resting the second lateral side of the person on the second lateral portion of the wrap, at least one of the first lateral portion and the second lateral portion having at least one connector located towards one of the lateral sides of the person when the person is retained in the wrap; coupling the wrap to a support structure that is generally inflexible along a longitudinal axis and a hoist via the at least one connector; and operating the hoist to at least partially elevate the at least one of the first lateral portion and the second lateral portion.

The method can include operating the hoist to fully elevate the wrap retaining the person. The method can include repositioning the wrap retaining the person. The method can include lowering the wrap retaining the person once repositioned, and decoupling the support structure from the wrap. The method can include uncoupling the first and second lateral portions along an exposed anterior or posterior side of the person. The method can further include elevating one of the first lateral side of the person; decoupling and removing a corresponding one of the first lateral portion and the second lateral portion; resting the one of the first lateral side and the second lateral side of the person on the surface; elevating the other of the first lateral side and the second lateral side of the person; and removing the remaining one of the first lateral portion and the second lateral portion.

In still yet another aspect, there is provided an apparatus for at least partially elevating a person, comprising a support structure having a first set of connectors for connecting to a second set of connectors of a person-retaining structure retaining a person along a longitudinal axis of the person, the support structure having a set of hoist connectors dimensioned to be couplable to a hoist, the set of hoist connectors enabling coupling of the hoist to the support structure at at least two positions along the longitudinal axis.

The person-retaining structure can be a wrap that inhibits relative movement of the knees, hips, and shoulders of a person.

The support structure can be inflexible to bowing towards the person-retaining structure.

The support structure can be a rigid member.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
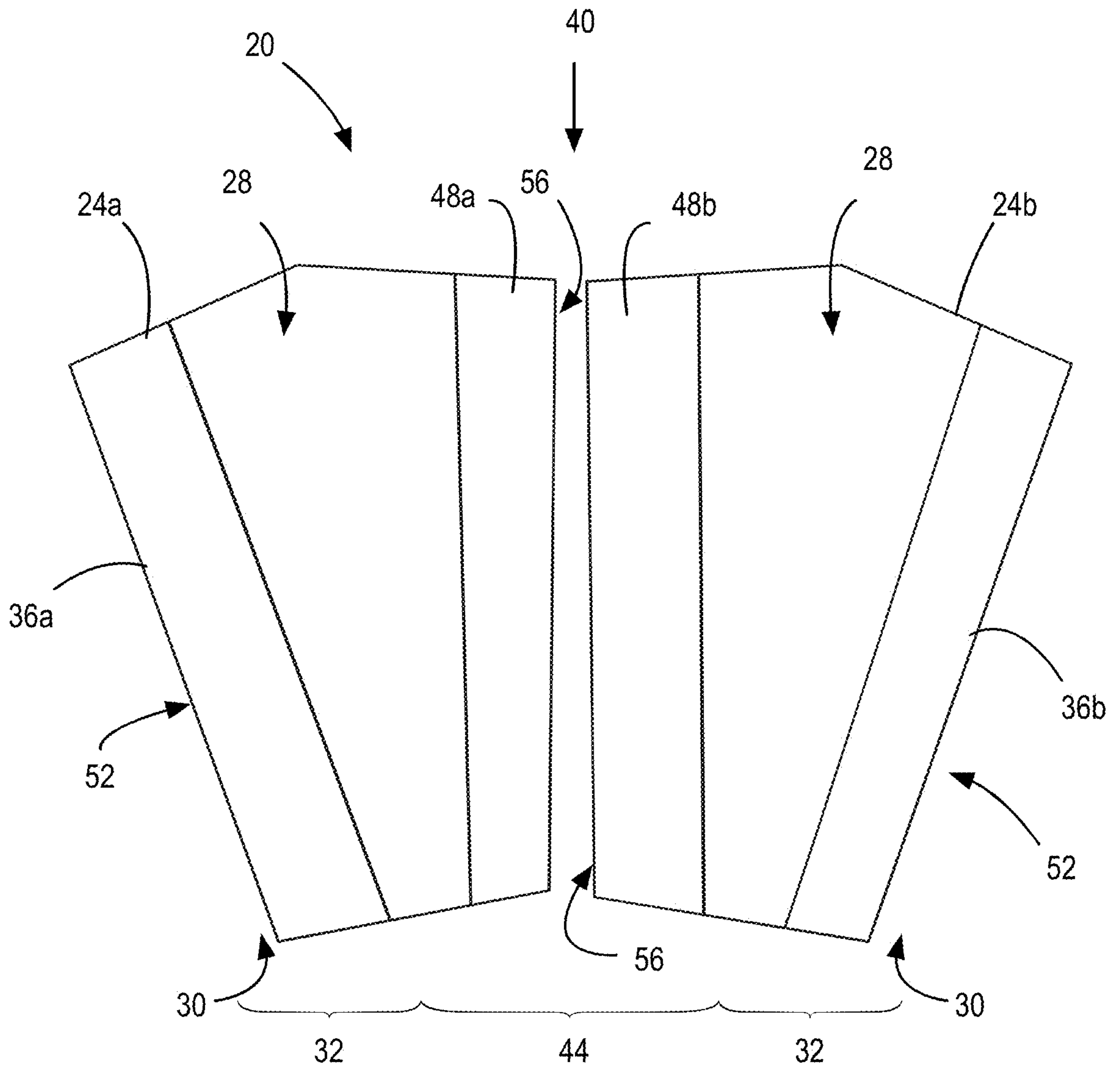
FIG. 1 shows two decoupled lateral portions of a wrap of an apparatus for reorienting a person in accordance with an embodiment.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The term "longitudinal", unless specified otherwise, shall mean, as used herein, extending generally parallel to an axis between the head and feet of a person.

FIG. 1 shows a wrap 20 of an apparatus for reorienting a person in accordance with an embodiment. The wrap 20 includes a right lateral portion 24*a* and a left lateral portion 24*b*. The right and left lateral portions 24*a*, 24*b* are made of a flexible material. A central region 28 of each of the lateral portions 24*a*, 24*b* can be made from any common material that is used for wraps such as cotton, or some plastic composite. In addition, the central region 28 can be a continuous span of material, a mesh, etc. Preferably, the material is breathable to enable prolonged periods of positioning of a person thereon.

The lateral portions 24*a*, 24*b* are releasably securable to one another along an anterior joint 30 positioned along an anterior region 32 of the wrap 20 between lateral sides of a person when retained therein via a first set of fasteners 36*a*, 36*b*. In addition, the lateral portions 24*a*, 24*b* are releasably securable to one another along a posterior joint 40 positioned along a posterior region 44 of the wrap 20 between the lateral sides of the person when retained therein via a second set of fasteners 48*a*, 48*b*. While the fasteners 36*a*, 36*b*, 48*a*, 48*b* are shown as hook-and-loop fasteners of the lateral portions 24*a*, 24*b*, any suitable means for releasably securing the lateral portions 24*a*, 24*b* to one another can be employed. Preferably, the fasteners are positioned towards the anterior and posterior edges 52, 56 to facilitate securing of the lateral portions 24*a*, 24*b* to one another. For example, the fasteners 36*a*, 36*b*, 48*a*, 48*b* can be hook-and-loop fabric patches, zippers, snaps, hooks and corresponding loops, buttons and buttonholes resistant to tensile forces, etc. In some embodiments, the fasteners provide adjustability of the position of the lateral portions relative to one another when secured together so that a range of differently sized persons can be accommodated using the wrap. The fasteners are selected to be sufficiently secure when closed to support the weight of a person enveloped in the wrap 20. It is contemplated that the dimensions of the wrap 20 will accommodate a range of sizes of person and that a set of sizes of the wrap can be provided to accommodate a set of ranges of sizes of people.

Figure 2:
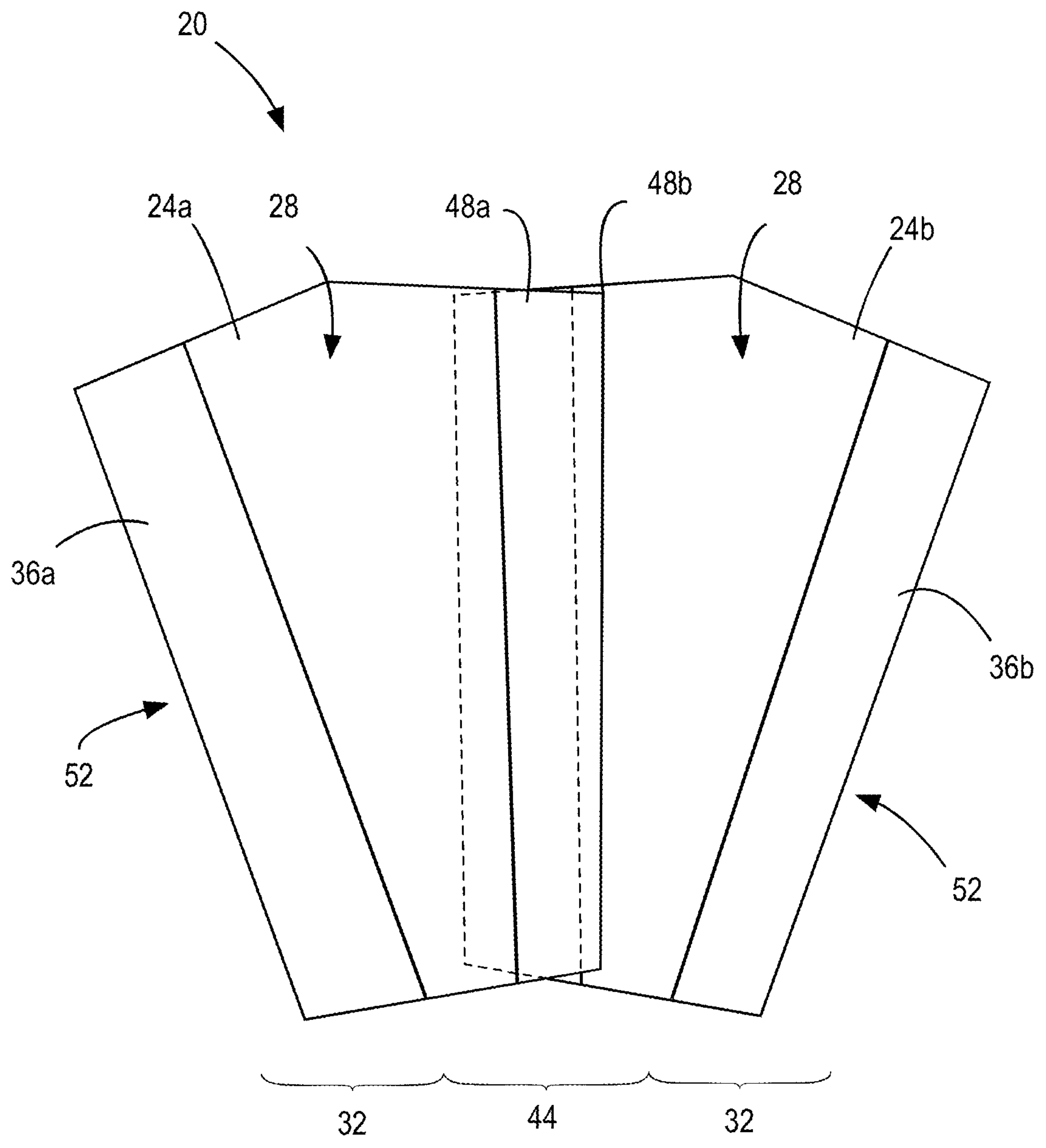
FIG. 2 shows the two lateral portions of the wrap of FIG. 1 after securing the two lateral portions together along a posterior joint.

FIG. 2 shows the two lateral portions 24*a*, 24*b* secured to one another via the fasteners 48*a*, 48*b* along the posterior region 44 of the wrap 20; in particular, towards the posterior edges 56. The two lateral portions 24*a*, 24*b* can be joined in this manner and placed in advance on a bed on which a patient is to be positioned.

In a healthcare facility, a healthcare worker such as a nurse can place the wrap 20 on a bed before a patient arrives to the intensive care unit so that the wrap 20 is positioned underneath the patient 60 when they are placed in the bed.

Figure 3:
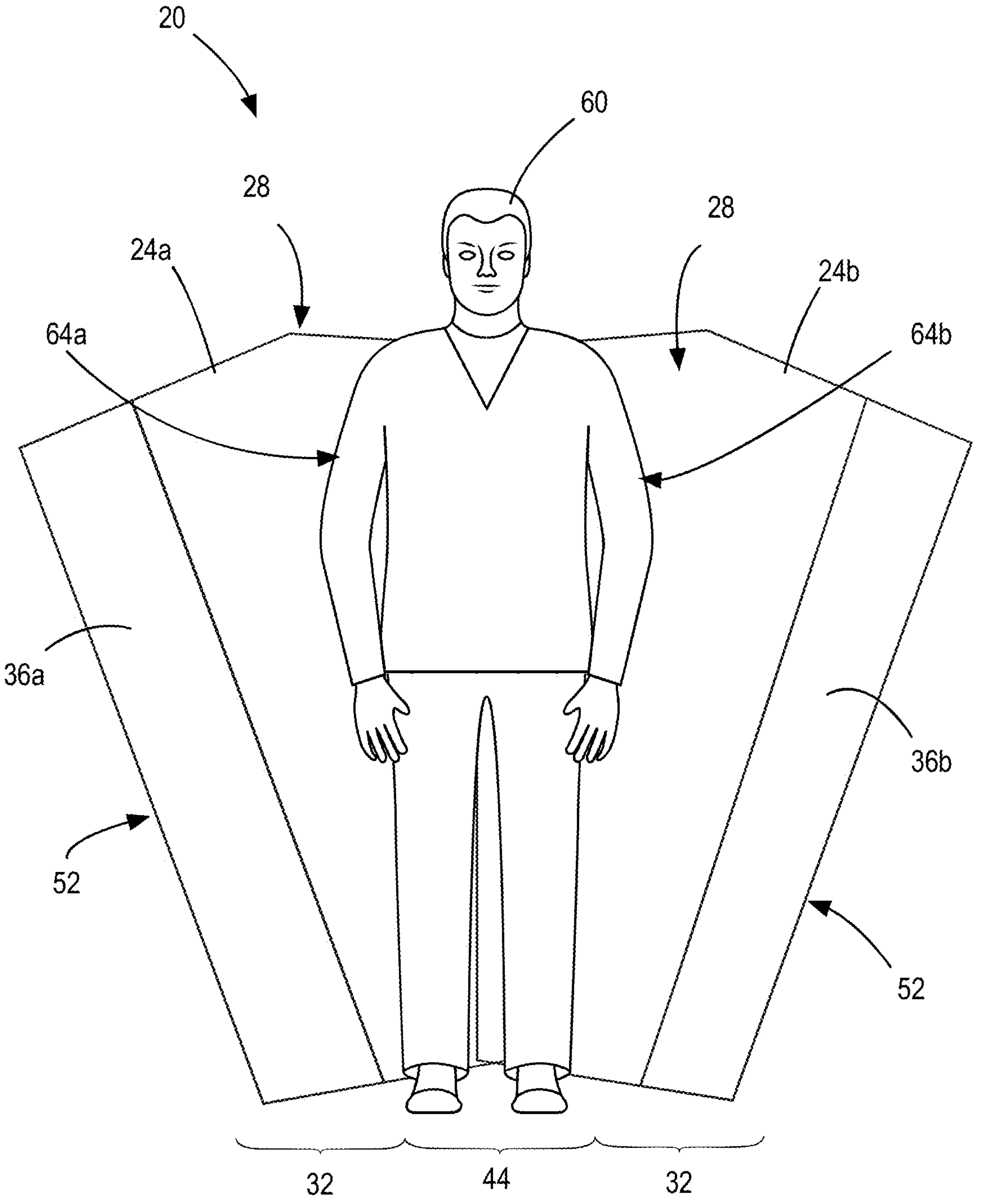
FIG. 3 shows a patient being positioned on the wrap of FIG. 2.

FIG. 3 shows a patient 60 being placed on top of the two lateral portions 24*a*, 24*b* secured to one another as shown in FIG. 2. The patient 60 has a right lateral side 64*a* and a left lateral side 64*b*.

When it is desired to at least partially elevate the patient 60 on the bed between the supine position and the prone position, the wrap 20 is enclosed around the patient 60 and secured via the fasteners 36*a*, 36*b* on the anterior side of the patient 60.

Figure 4:
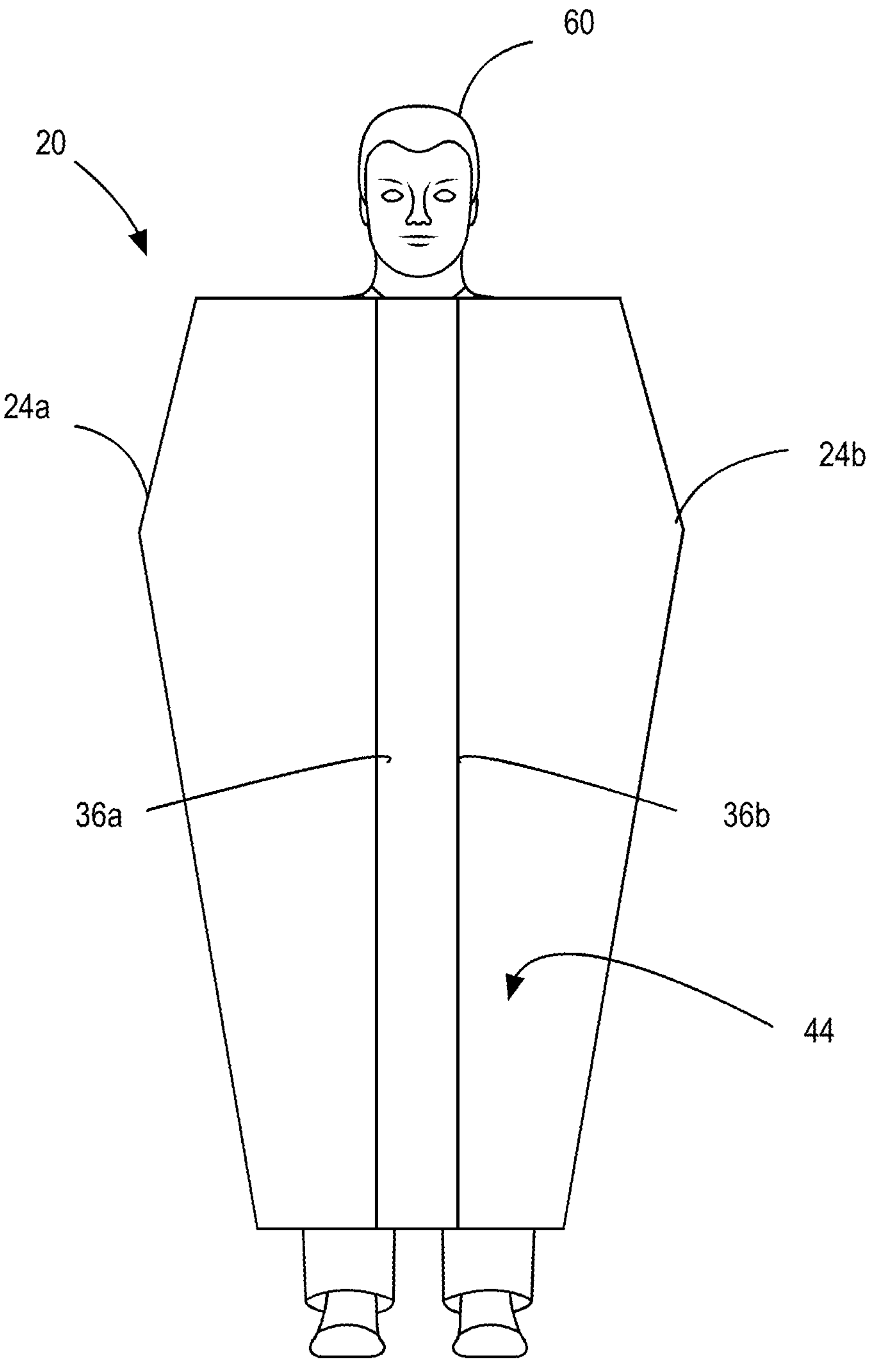
FIG. 4 shows the wrap restraining the patient after the two lateral portions are secured together along an anterior joint of the wrap.

FIG. 4 shows the patient being snuggly wrapped or retained inside the wrap 20 after wrapping the lateral portions 24*a*, 24*b* around the patient 60. To retain the patient 60 in the wrap 60, the two anterior edges 52 of the lateral portions 24*a*, 24*b* are brought together on an anterior side of the patient 60 and the fasteners 36*a*, 36*b* are secured to one another. In this manner, the wrap 60 can form a very tight cocoon around the body of the patient 60. As the wrap 20 is made of flexible materials, the wrap 20 can snugly encircle the patient 60.

Each of the right lateral portion 24*a* and the left lateral portion 24*b* is configured to extend around the right and left lateral sides 64*a*, 64*b*, respectively, of the patient 60.

The anterior and posterior edges 52, 56 of the right lateral portion 24*a* and the left lateral portion 24*b* are configured to extend at most partway across to an opposite one of the lateral sides 64*a*, 64*b* of the patient 60.

When secured on the patient 60, the wrap 20 is configured to extend at least from below knees of the patient 60 to above the elbows of the patient 60 to immobilize the body of the patient 60 when snugly retained therein. In the illustrated embodiment, the wrap extends from above the shoulders to the ankles of the patient 60.

Figure 5:
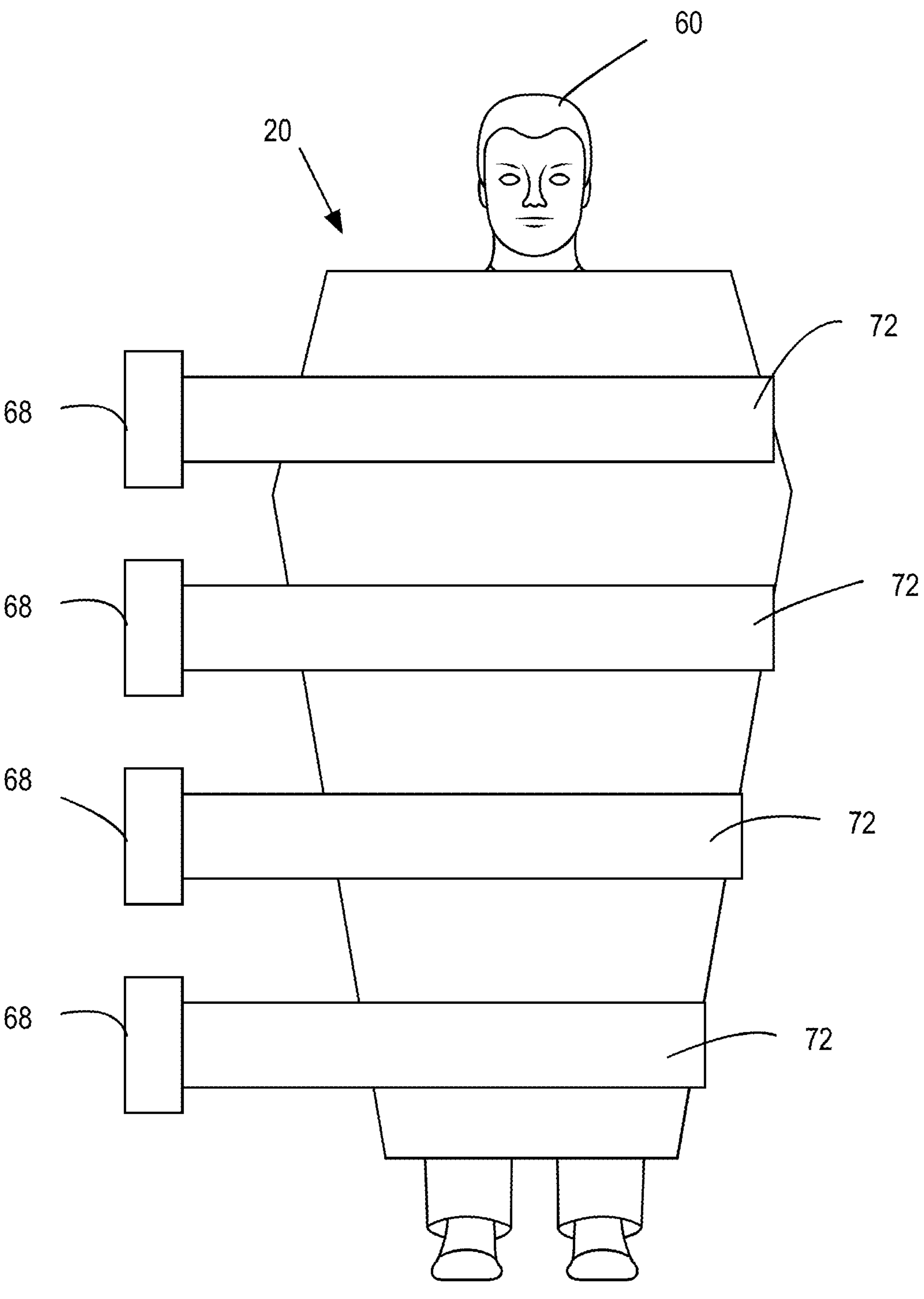
FIG. 5 shows a set of connectors positioned along a lateral side of the wrap of FIGS. 1 to 4.

FIG. 5 shows at least one connector 68 positioned along a lateral side of the wrap 20 configured to be positioned along one of the lateral sides 64*a*, 64*b* of the patient 60 when the patient 60 is retained in the wrap 20. The connectors 68 are provided at the ends of vinyl straps 72 that are wrapped around or secured to the right lateral portion 24*a* and/or the left lateral portion 24*b* of the wrap 20. The straps 72 are, preferably sequentially, secured around the patient 60 and to a D-ring apparatus to tightly secure them around the patient 60.

Figure 6:
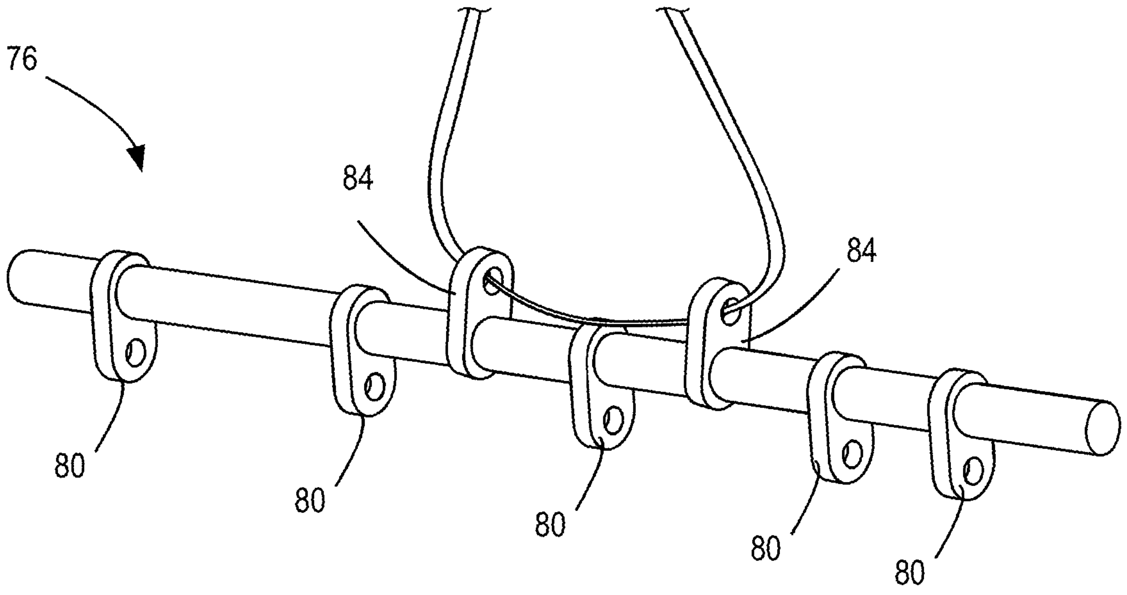
FIG. 6 shows a cylindrical support bar of the apparatus for use with the wrap of FIG. 1.

FIG. 6 shows a support structure in the form of a support bar 76 forming part of the apparatus. The support bar 76 is a cylindrical bar that is either hollow or solid and is made of a suitably rigid material, such as steel or tempered aluminum. The support bar 76 includes a set of connectors 80 for connecting to the connectors 68 of the wrap 20. A pair of hoist connectors in the form of brackets 84 enable connection to a hoist.

Figure 7:
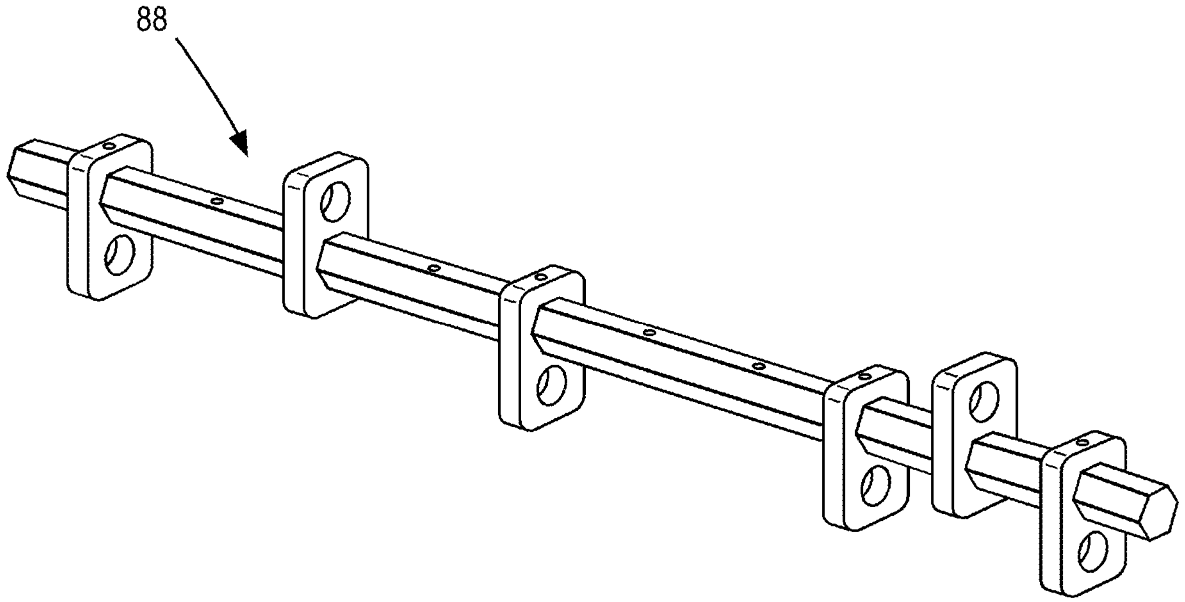
FIG. 7 shows a hexagonal support bar of the apparatus in accordance with another embodiment.

FIG. 7 shows a support structure in the form of a support bar 88 in accordance with another embodiment, wherein the support bar 88 is hexagonal in cross-section. The support bar 88 can be hollow or solid. The bar connects to the patient hoist device, or any other device that could be used to lift the patient.

Figure 8:
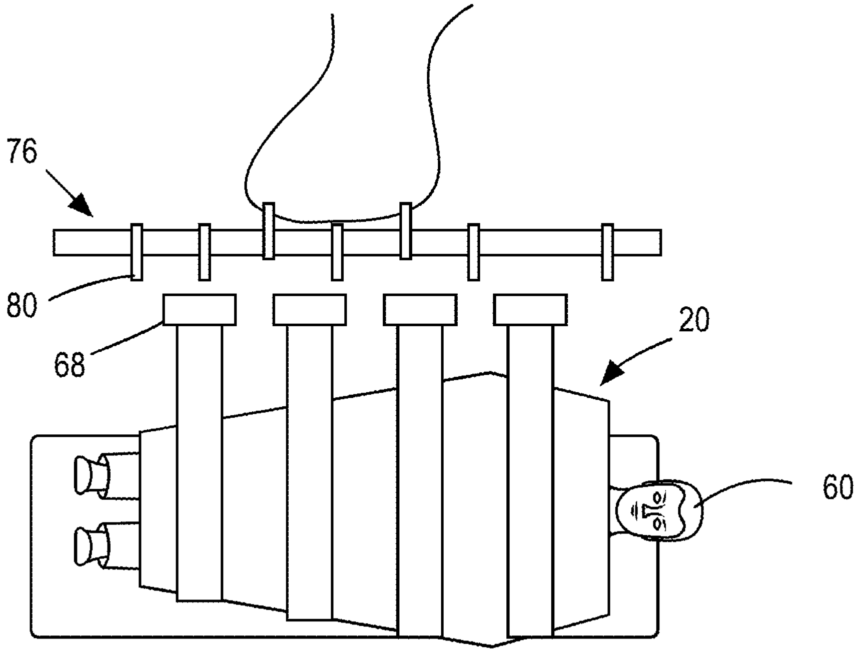
FIG. 8 shows the cylindrical support bar of FIG. 6 being positioned for coupling to the wrap of FIG. 1.

FIG. 8 shows the support bar 76 of FIG. 6 positioned adjacent to the wrap 20 within which the patient 60 is retained. The connectors 80 of the support bar 76 are aligned with the connectors 68 of the wrap 20 and then secured thereto via any suitable means. As can be seen, the patient 60 is encapsulated with the "cocoon" wrap 20. Once the support bar 76 is connected to the patient 60, a hoist can be attached to the support bar 76 to at least partially elevate the wrap 20 and, thus, the patient 60 to reorient the patient 60 or otherwise move the patient 60—for example, to move the patient to another bed or another location in the same bed, to elevate the patient 60 so that the bedding can be changed, etc. The hoist can be any commercial or custom lift for lifting patients, such as those employed in hospitals to securely lift and transfer patients.

Figure 9:
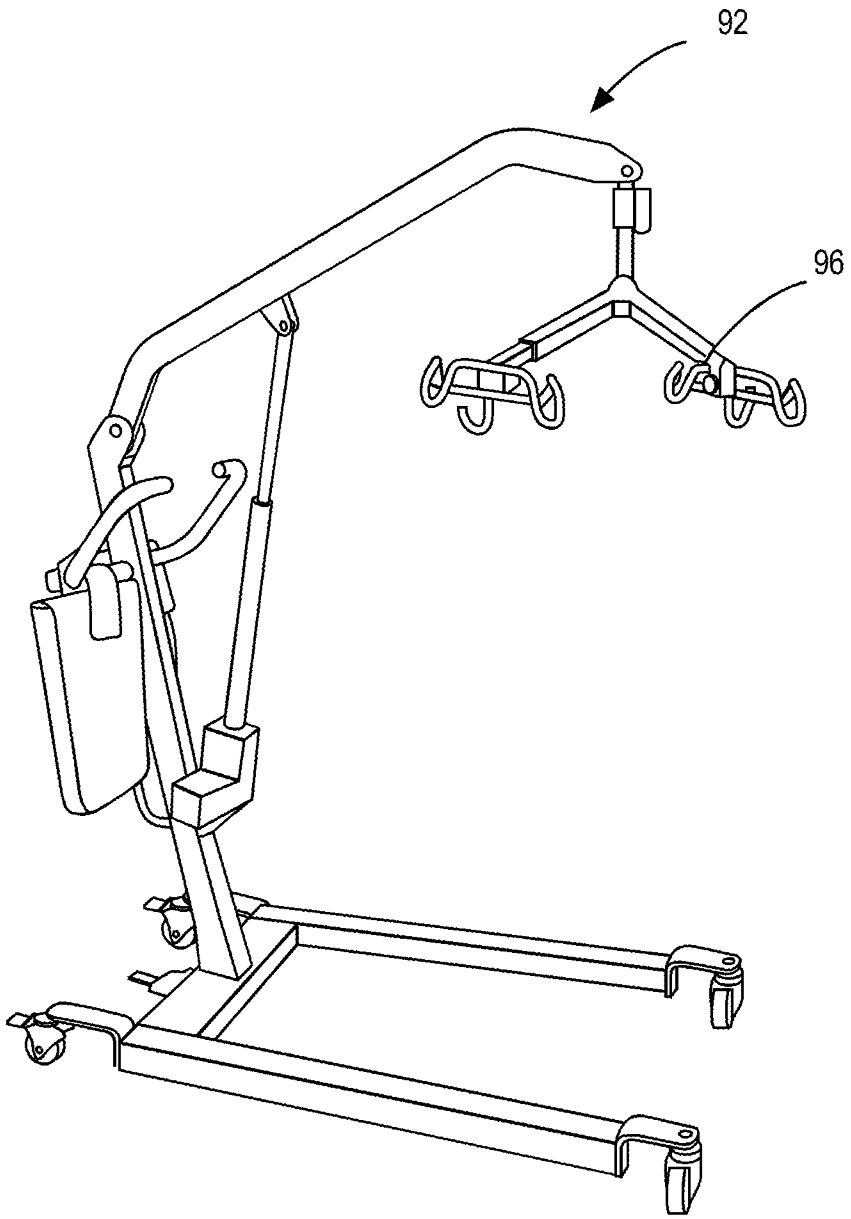
FIG. 9 shows an exemplary hoist for use with the apparatus of FIGS. 1 to 6 and 8.

FIG. 9 shows such a hoist 92—in particular, a "Medline MDS400EL Electric PATIENT LIFT", a commercially available hoist device for patients commonly used in hospitals. This is an example of a suitable hoist for use with the apparatus. The hoist 92 includes a cradle 96 designed to be coupled to various devices for lifting them.

Upon coupling of the support bar 76 to a lateral side of the wrap 20 and to a hoist, the patient can be at least partially elevated. A nurse on each side of the patient and a respiratory therapist at the head of the bed use the lift to slowly rotate and then lift the secured patient above the bed. Once lifted and having a lateral side hanging downwards towards the bed, the patient is then positioned so that they are lowered to the desired position (i.e., supine or prone). Padding to support the shoulders, the pelvis, and the knees can be secured to the patient when supine, and lifted with the patient. Alternatively, the patient can be rolled prone on to the pads that are put in place. Once prone, the vinyl straps, which are held in place on the wrap with adhesive or fastener attachments, or any other suitable means, are loosened and then rotated off the posterior of the patient. The posterior side of the two-piece wrap, which was held together with the fasteners, is separated to expose the back of the patient. The nurse has access to the patient for nursing purposes and the tight wrap 20 can be released, so the "binder" effect of the wrap 20 can be terminated quickly.

A patient is typically prone for 16 hours and then turned back to the supine position. To do this, the nurse will close the wrap 20 by wrapping the lateral portions 24*a*, 24*b* tightly over the patient 60 and securing together the fasteners 48*a*, 48*b* of the lateral portions 24*a*, 24*b* of the wrap 20 along the posterior edges 56. The straps 72 are then rotated across the patient's posterior and tightened and secured with a D-ring apparatus to re-envelop the patient securely in the wrap 20. The wrap 20 can then be connected to the support bar 76, and healthcare workers (such as a three-person team) work to lift and reorient the patient from a prone position to a supine position. This cycle can be repeated as needed, often for several days. The wrap 20 can be used for several days over the proning cycle. The apparatus including the wrap 20 and the support bar 76 are reusable and easily cleaned between uses.

In an alternative embodiment, the straps can couple to connectors on both lateral sides of the body of the patient to enable connection to the support bar and the lift on either lateral side of the patient. In addition, the loops 168 can be configured to serve as handles for manual movement of the patient 60 in the wrap 100.

Figure 10A:
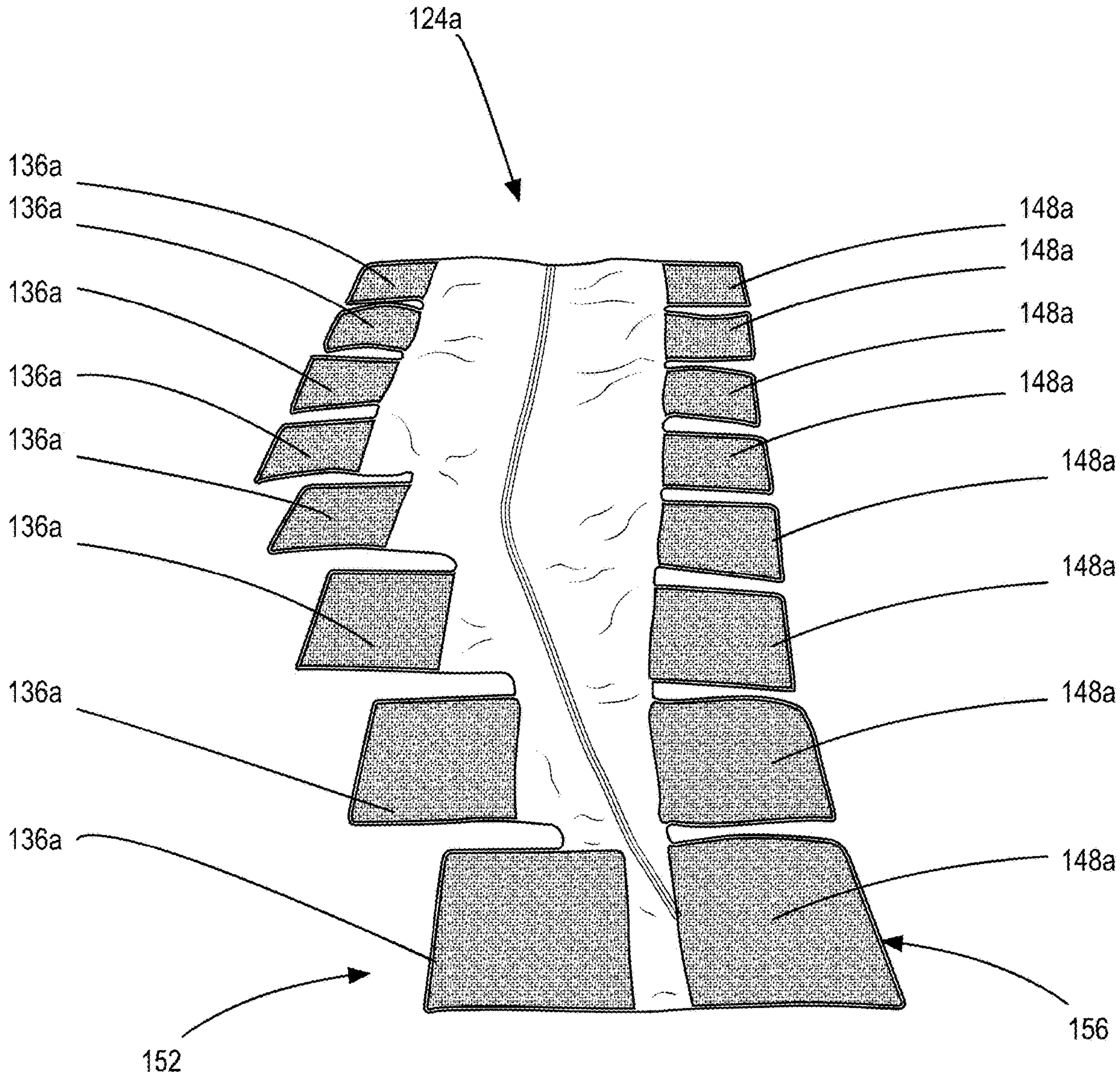
FIGS. 10A and 10B show right and left lateral portions of a wrap laying on their outer surfaces in accordance with a further embodiment.
Figure 10B:
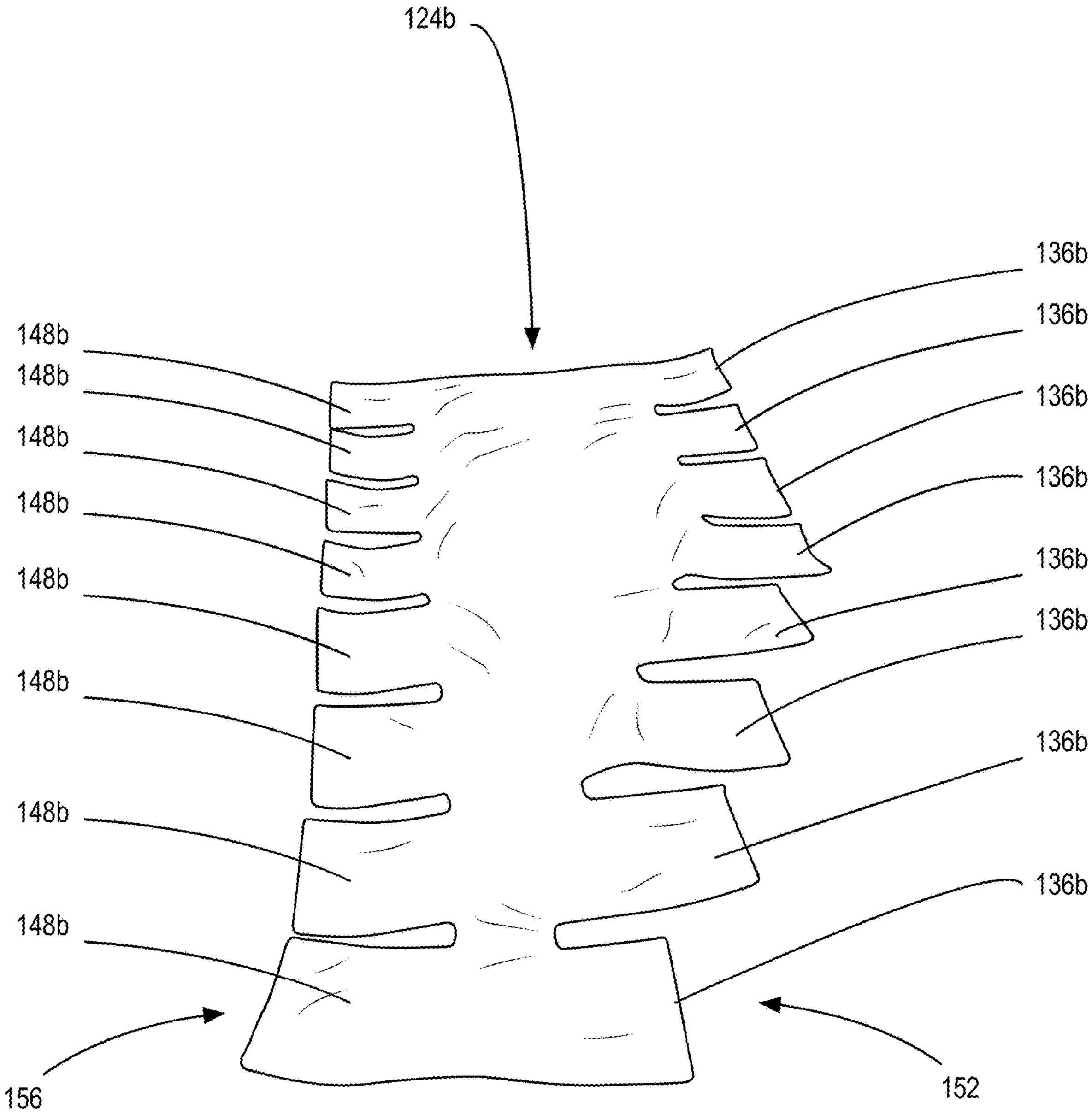

FIGS. 10A and 10B show right and left lateral portions 124*a* and 124*b* of a wrap forming part of an apparatus for reorienting a patient in accordance with another embodiment. The right and left lateral portions 124*a* and 124*b* are made of flexible materials that enable the wrap to encircle a person snugly to inhibit relative movement of their knees, hips, and shoulders. The right and left lateral portions 124*a* and 124*b* are illustrated lying on their outer surfaces (i.e., the surfaces that face away from a person when the wrap is positioned on the person) and include a first set of fasteners along the anterior edges 152 of the lateral portions 124*a*, 124*b* in the form of hook-and-loop fabric patches 136*a*, 136*b*. In addition, the right and left lateral portions 124*a* and 124*b* include a second set of fasteners along the posterior edges 156 of the lateral portions 124*a*, 124*b* in the form of hook-and-loop fabric patches 148*a*, 148*b*. The hook-and-loop fabric patches 148*a*, 148*b* are positioned on straps or fingers that are separated to more readily enable better placement of each of the hook-and-loop fabric patches 148*a*, 148*b* to accommodate differently dimensioned people or different desired snugness.

Figure 11A:
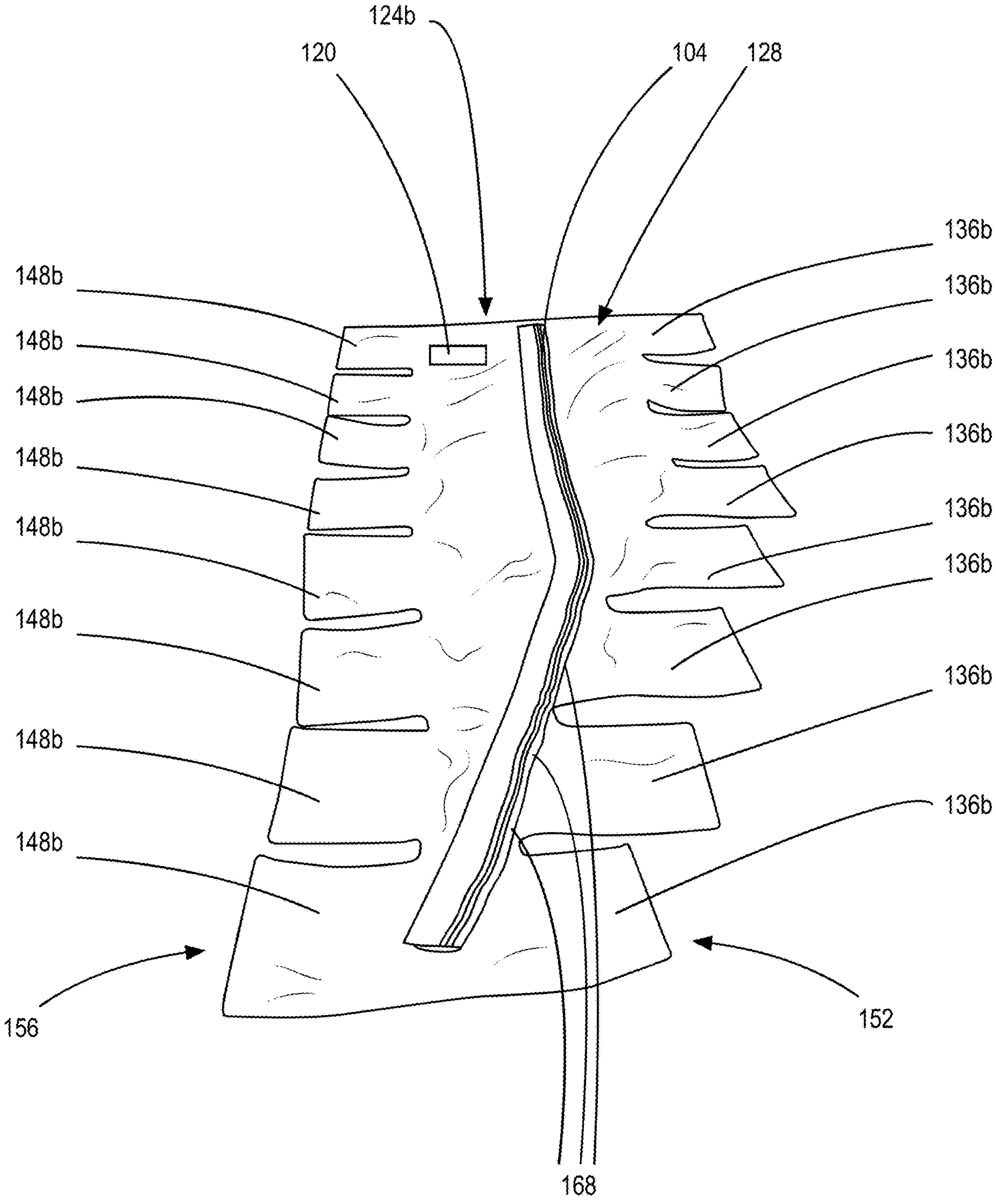
FIGS. 11A and 11B show the outer surfaces of the right and left lateral portions of FIGS. 10A and 10B respectively.

FIG. 11A shows the outer surface of the right lateral portion 124*a*. The right lateral portion 124*a* is shown having a reinforcement fabric strip 104 that is stitched to a central region 128 of the right lateral portion 124*a*. The stitching of the reinforcement fabric strip 104 is intermittently occurring along the length of the reinforcement fabric strip 104 to define connectors in the form of loops 168 along the length of the reinforcement fabric strip 104.

Figure 11B:
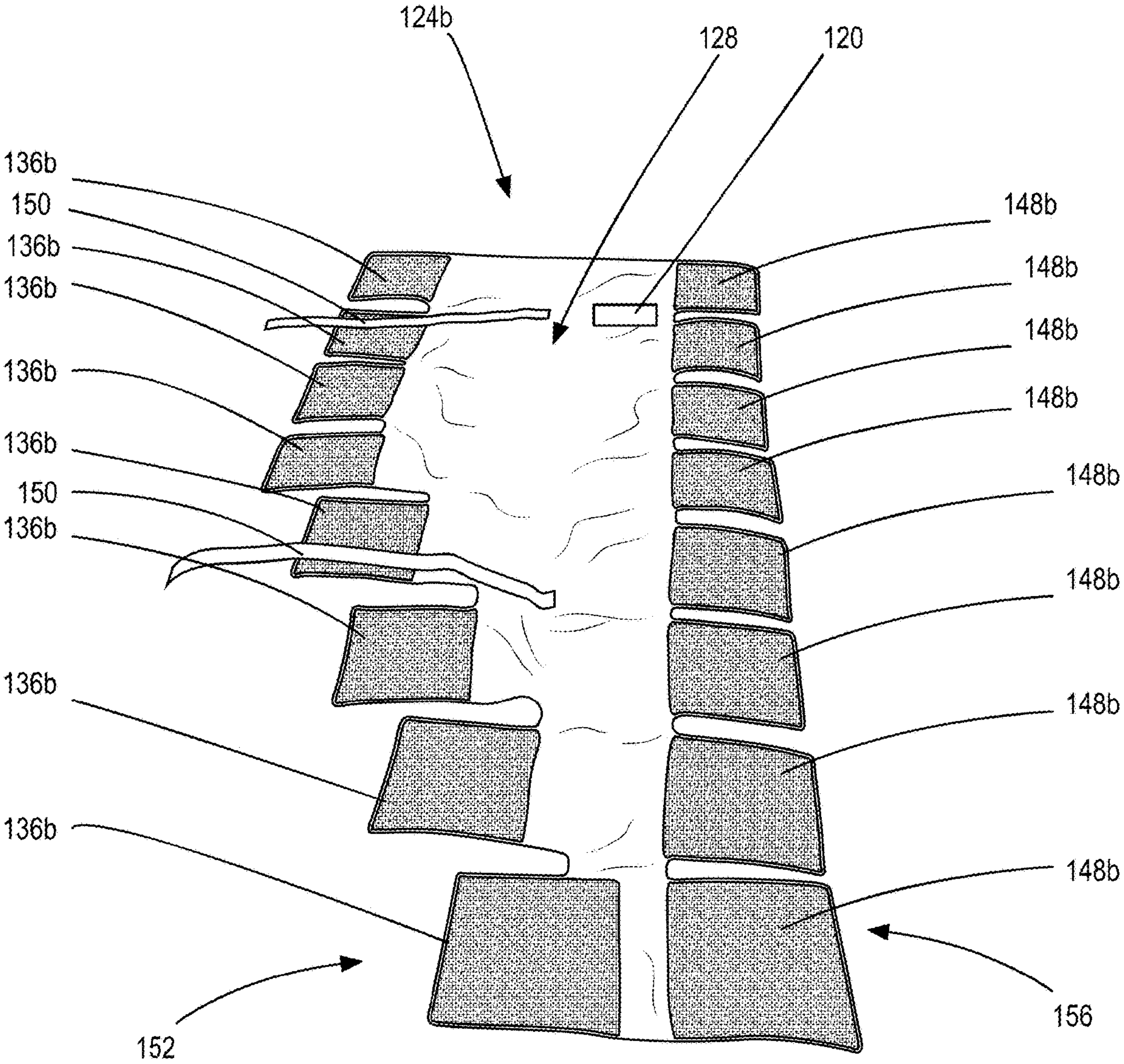
Figure 11C:
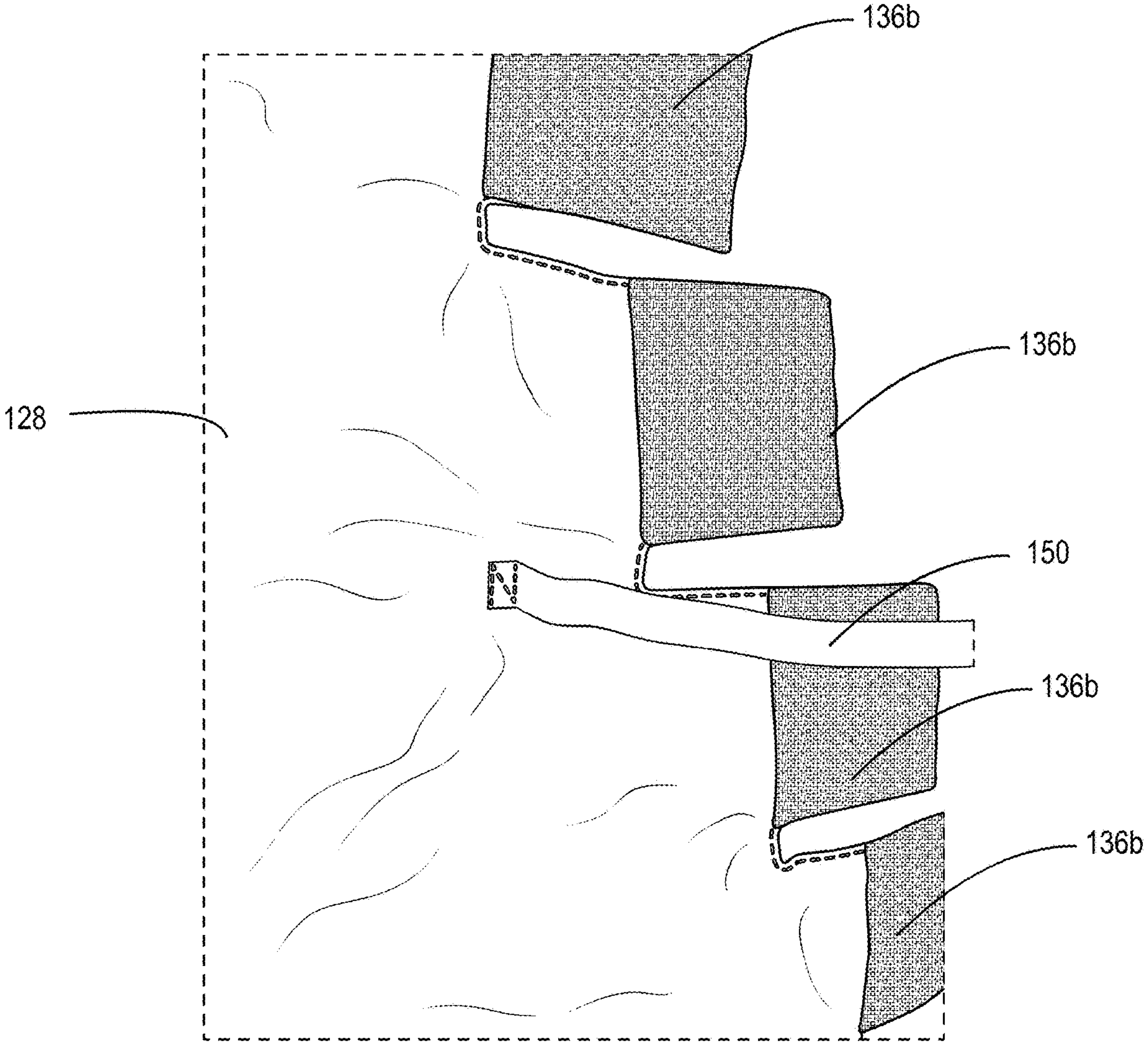
FIG. 11C shows a guide strap secured to the outer surface of the left lateral portion of FIGS. 10A and 11A.

FIG. 11B shows the outer surface of the left lateral portion 124*b*. The left lateral portion 124*b* is shown having a pair of guide controls in the form of guide straps 150 secured to a central region of the left lateral portion 124*b*. FIG. 11C shows the stitching of one of the guide straps 150 to the central region of the left lateral portion 124*b* in greater detail. While, in the embodiment illustrated in FIGS. 10A to 11B, the guide straps 150 are only secured to the left lateral portion 124*b* of the wrap 100, it is conceived that the guide straps can be secured to the right lateral portion 124*a*, or both lateral portions 124*a*, 124*b*. Further, the guide controls can be made in different configurations, such as loops, slots in the central region of the lateral portions, etc.

Loops 120 on the outer surfaces of the right lateral portion 124*a* and the left lateral portion 124*b* that are positioned on the posterior of a patient when enveloped within the wrap 100.

Figure 12:
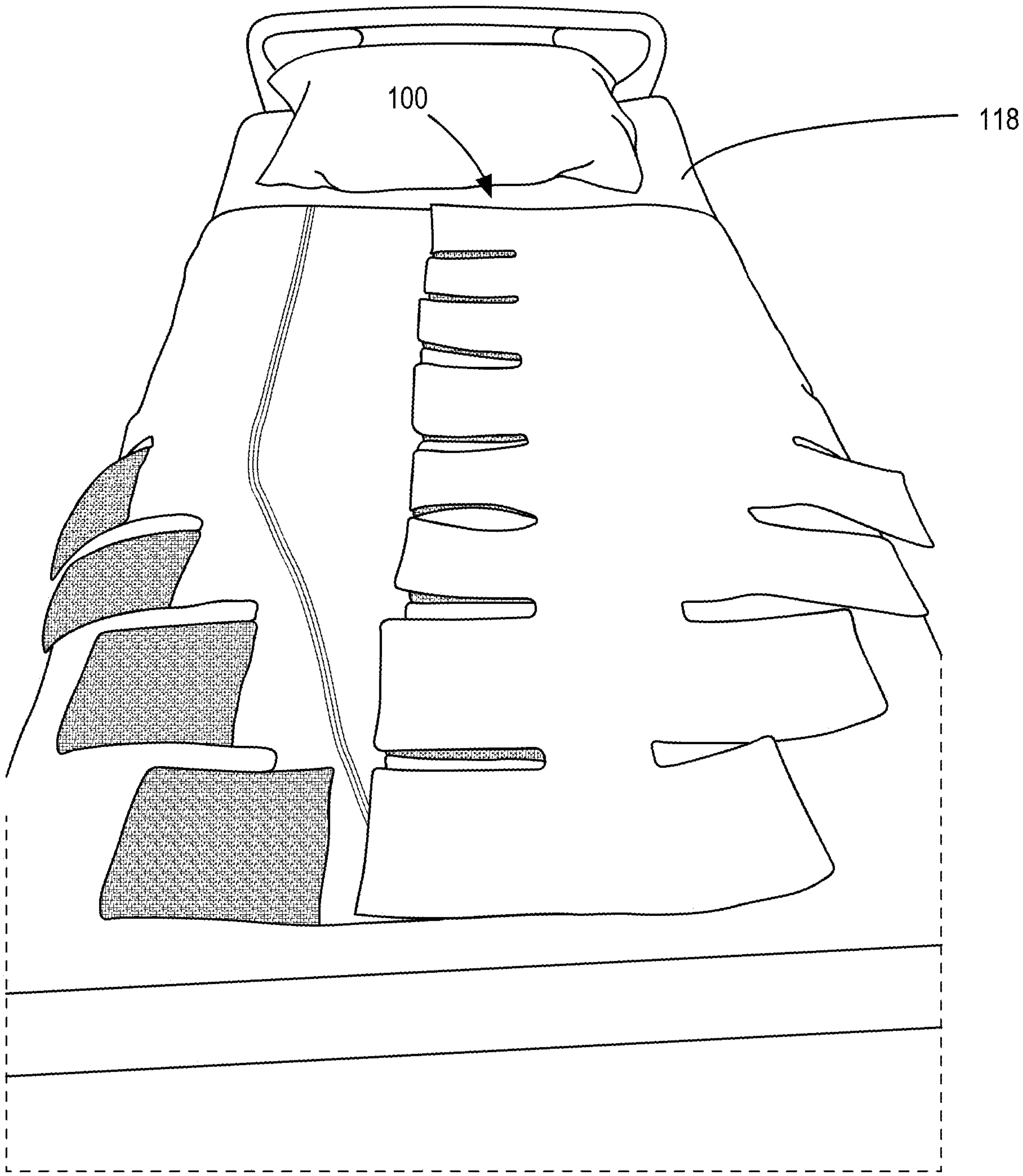
FIG. 12 shows the left lateral portion of the wrap of FIG. 10A and the right lateral portion of the wrap of FIG. 10B secured to one another along a posterior joint.

FIG. 12 shows the left and right lateral portions 124*a*, 124*b* secured to one another via the hook-and-loop fabric patches 148*a*, 148*b* along the posterior edges 156 of the lateral portions 124*a*, 124*b*. The wrap 100 is shown positioned on a hospital bed 118.

Figure 13:
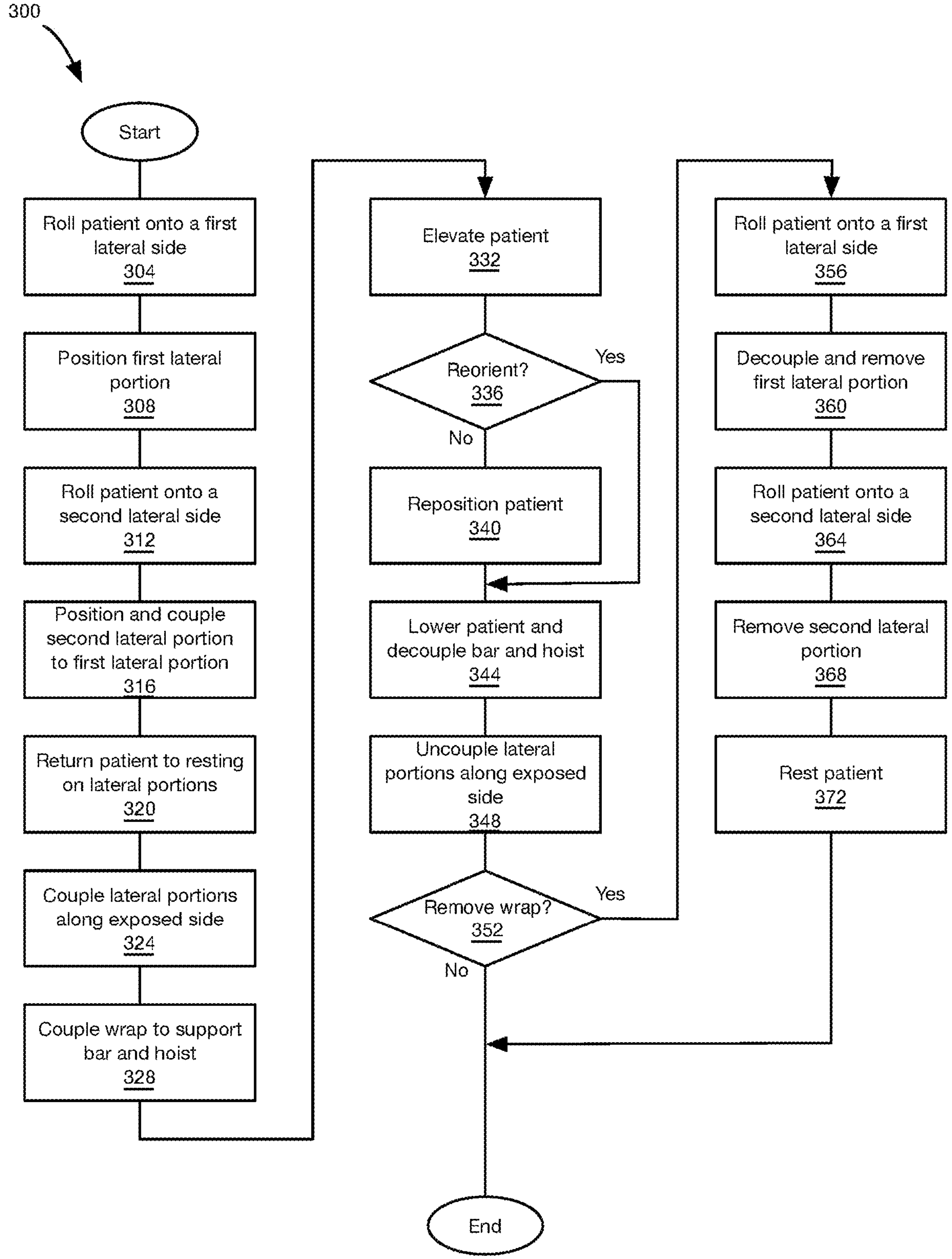
FIG. 13 shows the general method of elevating and reorienting a person using the wrap of FIGS. 10A to 12.
Figure 14A:
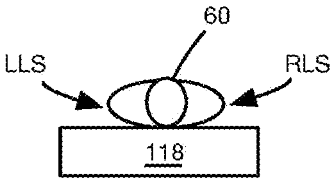
FIGS. 14A to 14R show the use of the wrap to retain and elevate the patient via the hoist of FIG. 9.

FIG. 13 shows the general method of reorienting a patient using the wrap 100 of FIGS. 10A to 12 at 300. The design of the wrap 100 facilitates its placement on a patient and thus reduces the time required to deploy it and risk of physical strain on the personnel and the patient. FIG. 14A shows the position of the patient 60 on the bed 118 in the supine position prior to commencement of the method 300.

Figure 14B:
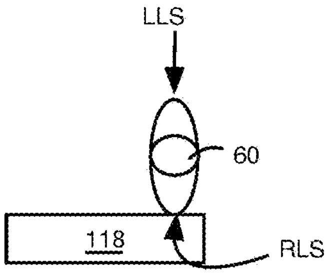
Figure 14C:
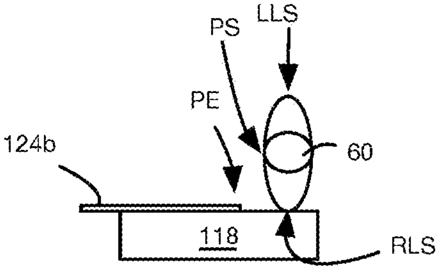
Figure 14D:
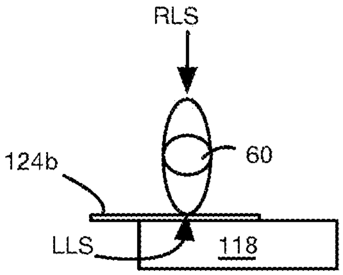
Figure 14E:
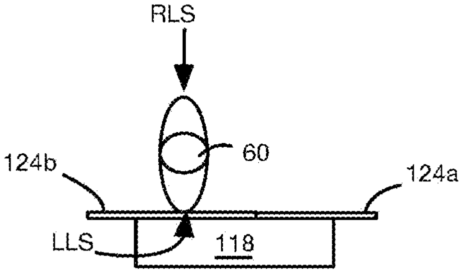
Figure 14F:
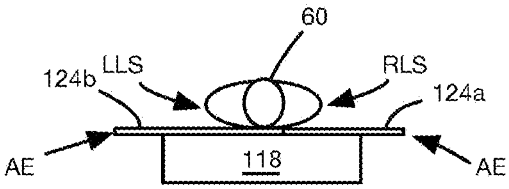
Figure 14G:
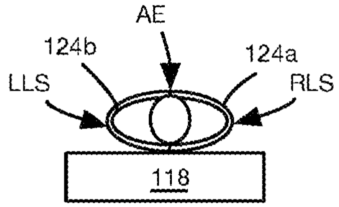
Figure 14I:
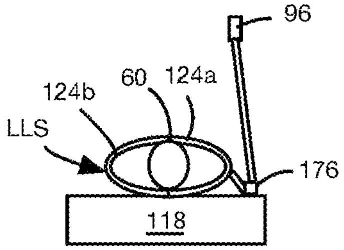
Figure 14J:
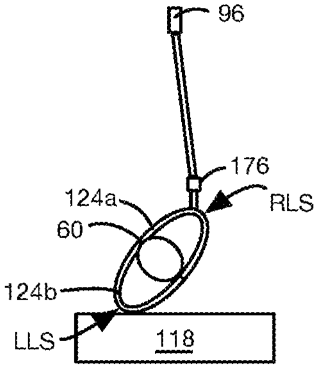
Figure 14K:
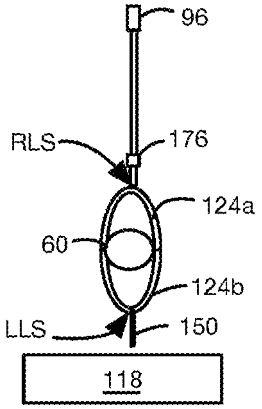
Figure 14L:
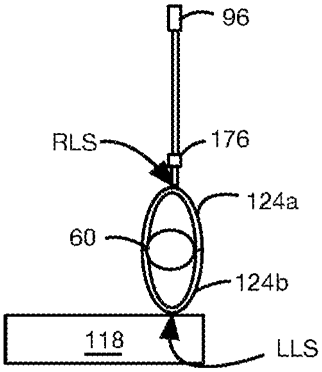
Figure 14M:
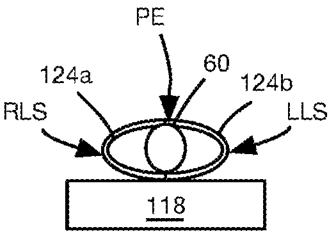
Figure 14H:
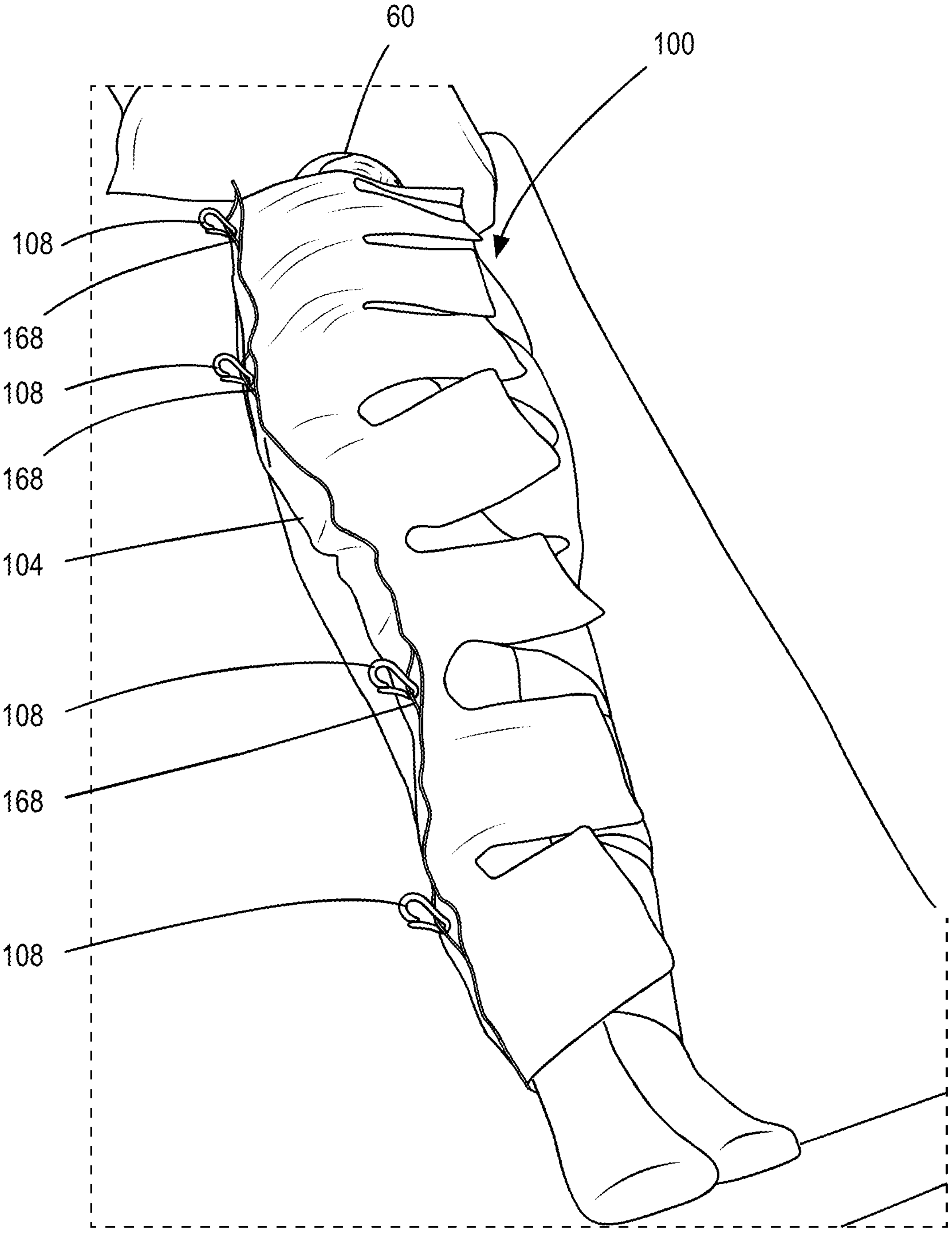
Figure 14N:
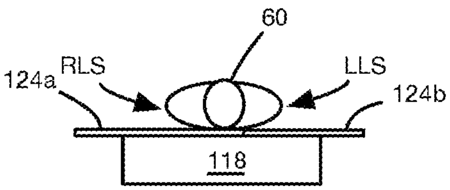
Figure 14O:
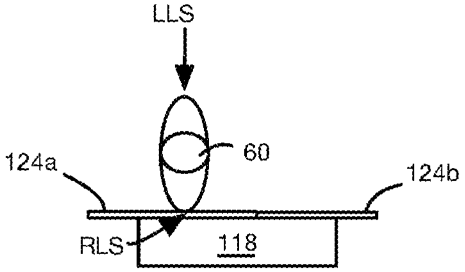
Figure 14P:
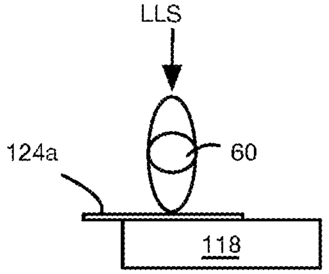
Figure 14Q:
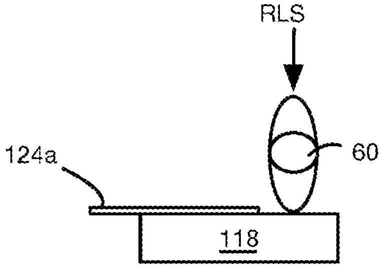
Figure 14R:
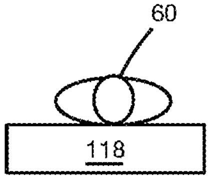

Now with reference to FIGS. 13 and 14A to 14R, the method 300 commences with the rolling of the patient onto a lateral side (304). This is shown in FIG. 14B, wherein the patient 60 is rolled onto their right lateral side RLS by moving their left lateral side LLS. Once the patient 60 is positioned on their RLS, the left lateral portion 124*b* of the wrap 100 is positioned on the bed 118 where the elevated left lateral side LLS of the patient 60 was resting (308), as is shown in FIG. 14C. The posterior edge PE of the left lateral portion 124*b* is positioned centrally on the bed 118 where the patient's posterior side PS was resting. In the illustrated example, as the patient 60 was rolled onto their right lateral side RLS at 304, the left lateral portion 124*b* of the wrap 100 can be positioned on the bed 118, but the patient 60 could have alternatively been rolled onto their left lateral side LLS at 304, in which case the right lateral portion 124*a* could have been placed where the right lateral side of the patient 60 was resting. It will be understood that the method 300 is illustrated in one orientation, but can be carried out in the other orientation. Similarly, the approach is generally the same if the patient is supine or prone.

The opposite lateral side of the patient 60 is then lifted to roll the patient 60 onto their other shoulder/lateral side (312). In the example, the patient 60 is rolled onto their left lateral side LLS, which is positioned on the left lateral portion 124*b*, as illustrated in FIG. 14D. The second lateral portion is then positioned adjacent the first lateral portion and coupled to it (316), as is illustrated in FIG. 14E, in which the right lateral portion 124*a* is positioned adjacent and coupled via the hook-and-loop fabric patches to the left lateral portion 124*b* while the patient 60 is held partially elevated on their left lateral side LLS. Thus, the at-least-two-piece construction of the wrap 100 facilitates placement of the wrap 100 underneath the patient 60. The patient 60 is then returned to resting on the lateral portions (320). The right lateral side RLS of the patient 60 can then be lowered, with the patient 60 now being fully positioned atop of the wrap 100, as shown in FIG. 14F.

The lateral portions 124*a*, 124*b* of the wrap 100 are then coupled along the exposed side of the patient 60 (324). As shown in FIG. 14G in the illustrated example, the anterior edges AE of the left and right lateral portions 124*a*, 124*b* are brought to meet atop of the anterior side of the patient 60 and secured together via the hook-and-loop fabric patches.

FIG. 14H shows the flexible wrap 100 secured around a patient 60 via fastening of the hook-and-loop fabric patches 136*a*, 136*b* along the anterior edges 152. Links in the form of a set of karabiners 108 is shown connected to the loops 168 of the reinforcement fabric strip 104. The wrap 100 is constructed of a material having very low elasticity, and is dimensioned and can be secured sufficiently snugly via the hook-and-loop fabric patches 136*a*, 136*b* to inhibit relative movement of the patient's knees, hips, and shoulders. In this manner, a patient can be effectively immobilized from shoulders to calves when secured within the wrap 100.

Figure 15A:
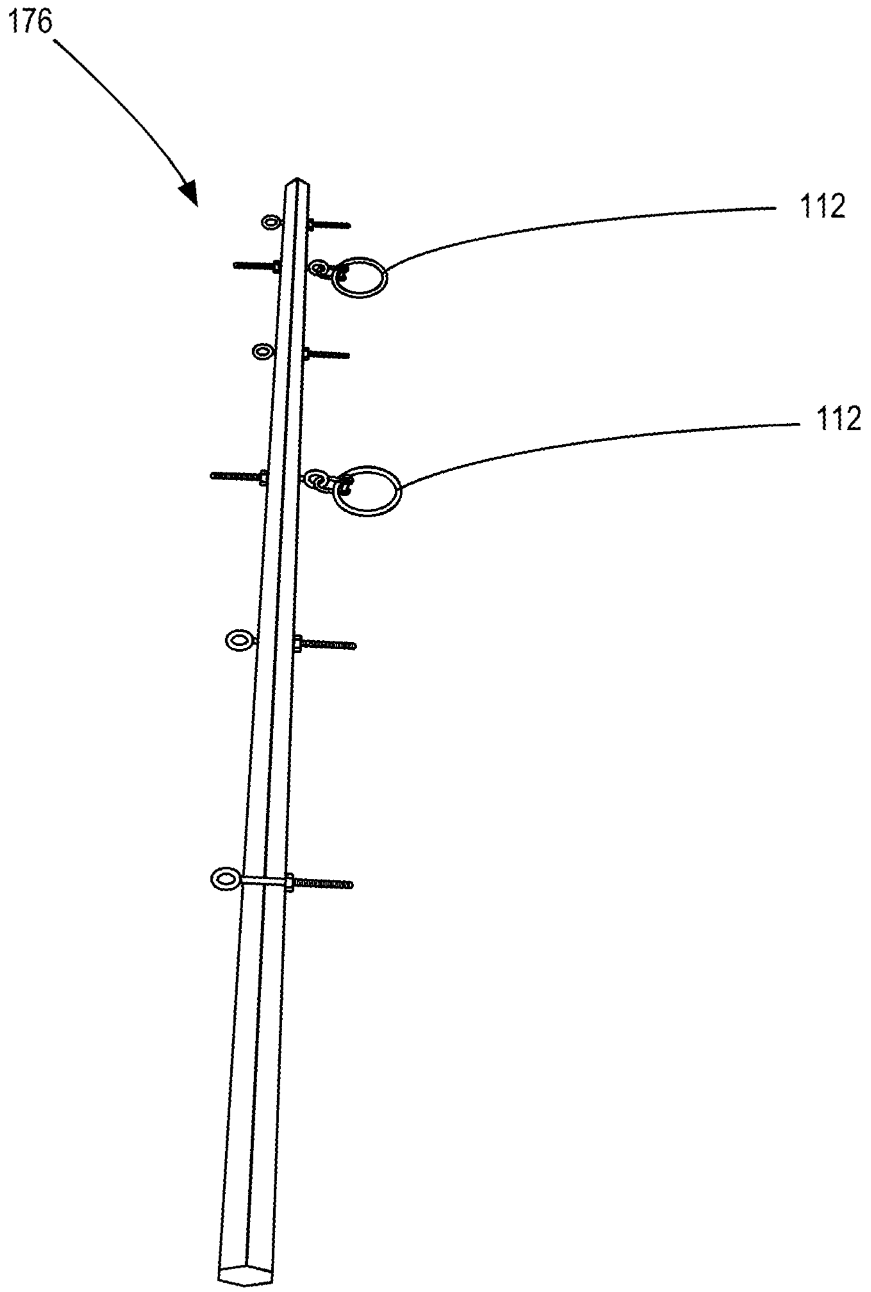
FIG. 15A shows a support bar for use with the wrap of FIGS. 10A and 10B.
Figure 15B:
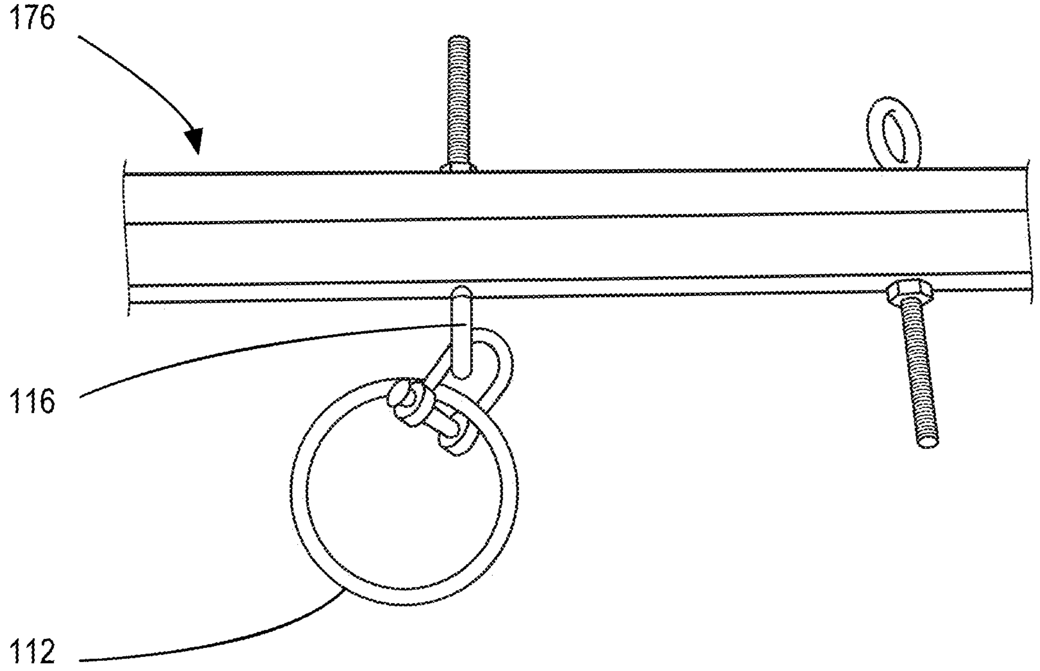
FIG. 15B shows a coupling link along the support bar of FIG. 15A.

Next, the wrap 100 is coupled to a support bar and the hoist 92 (328). FIG. 15A shows an exemplary rigid support bar 176 that is couplable to the wrap 100 via the karabiners 108 and including two rings 112 for coupling to the hoist 92. FIG. 15B shows the connection between one of the loops 112 and the support bar 176 in greater detail. The rings 112 is coupled to a bolt 116 that is fitted through a through-hole in the support bar 176 and secured in place via a nut. The support bar 176 and the cradle 96 of the hoist are shown after being coupled to the wrap 100 in FIG. 14I. In this illustrated example, the patient 60 is to be reoriented. Accordingly, the support bar 176 is coupled to one lateral side of the patient 60. In other scenarios where reorientation is not required, such as where the patient is to be transported to another bed or simply shifted in position on the same bed, the support bar 176 can be coupled to connectors on both lateral sides of the wrap to support and lift the patient from both sides to maintain their orientation.

Figure 16:
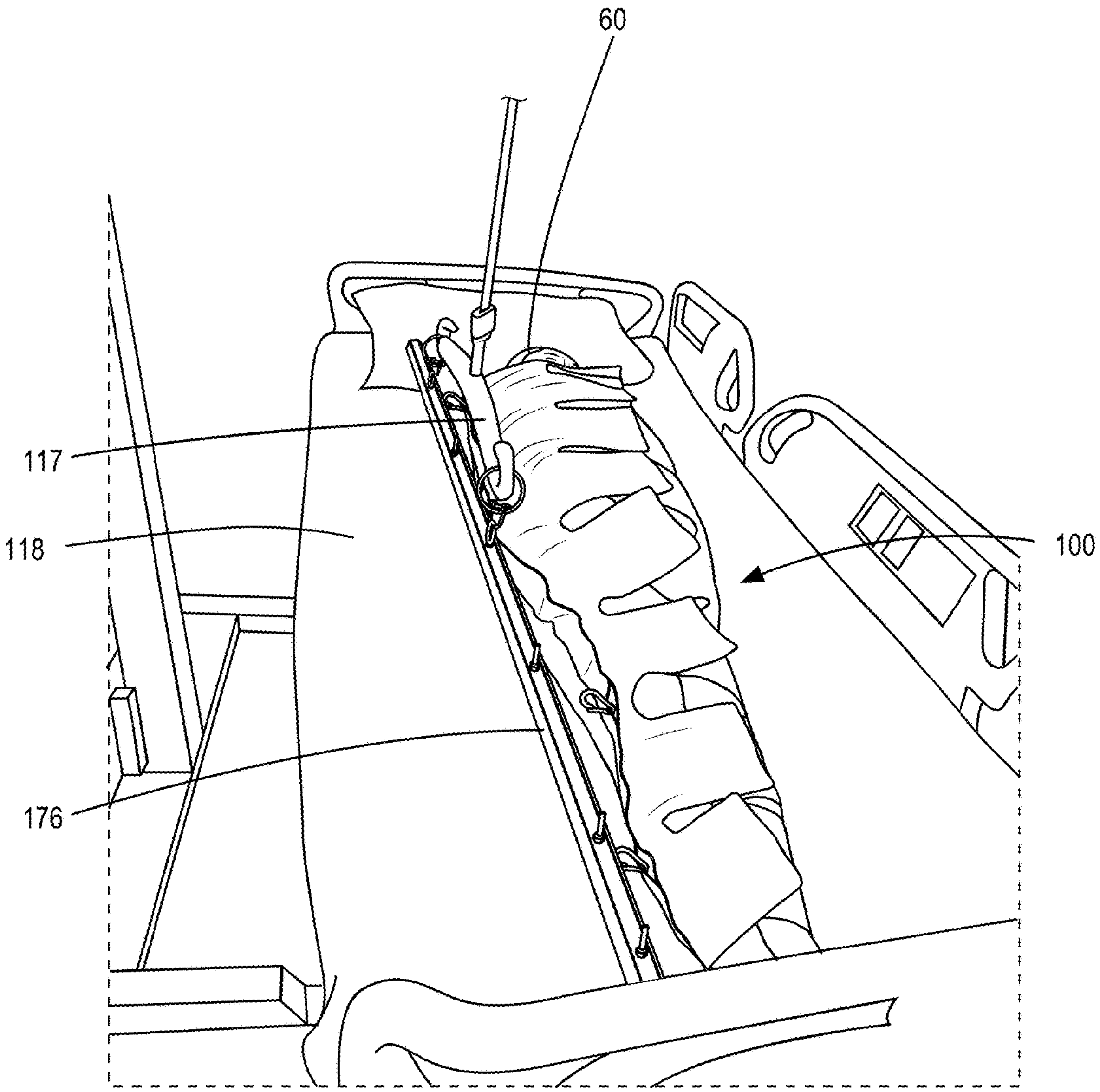
FIG. 16 shows the support bar of FIGS. 15A and 15B coupled to the wrap of FIGS. 10A and 10B.

FIG. 16 shows the apparatus wherein the support bar 176 has been coupled to the wrap 100 and to a cradle 117 of a hoist via the rings 112. The patient 60 is shown retained snugly in the wrap 100 in the supine position on the hospital bed 118. Once the support bar 176 has been coupled to the wrap 100 and the lift 117, the lift 117 can be operated to lift the patient 60 via the support bar 176.

Returning again to FIG. 13, the patient 60 is then at least partially elevated off of the bed 118 via the hoist (332). The hoist is operated to raise the cradle 96 which, in turn, raises the support bar 176. As the support bar 176 is raised, the lateral side(s) to which the support bar 176 is coupled is/are raised. In the illustrated example in FIG. 14J, the right lateral side RLS of the patient 60 is elevated. If the patient 60 is to be reoriented (336), continued operation of the hoist to further raises the cradle 96 lifts the patient 60 off of the bed 118, as is shown in FIG. 14K. Once the patient 60 is elevated, the patient 60 can be repositioned via shifting of the cradle 96 (such as via shifting of the hoist) (340).

Figure 17A:
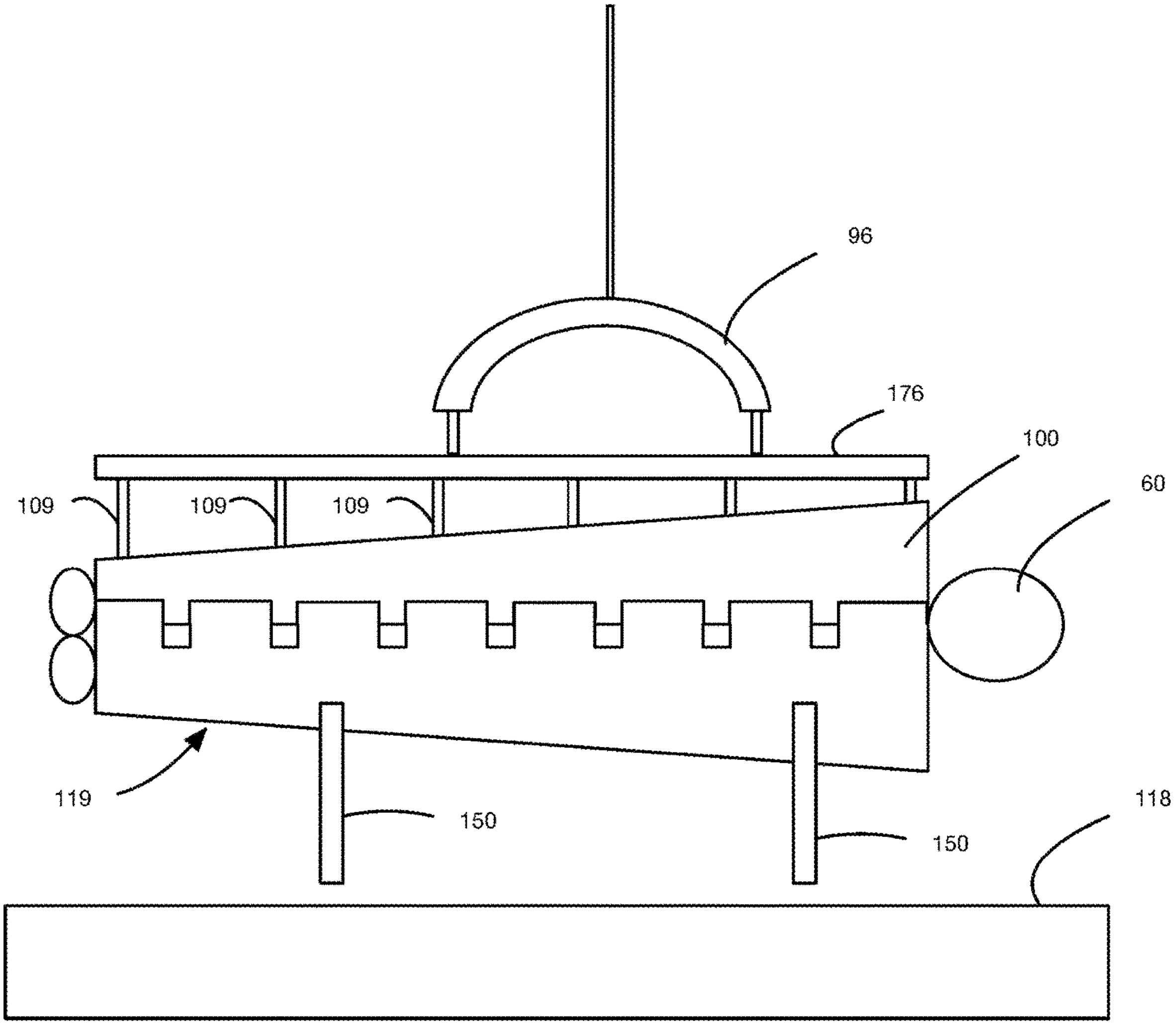
FIGS. 17A and 17B show side and end elevation views of the patient retained in the wrap of FIGS. 10A and 10B coupled to the support bar of FIGS. 15A and 15B which, in turn, is being elevated by a lift.
Figure 17B:
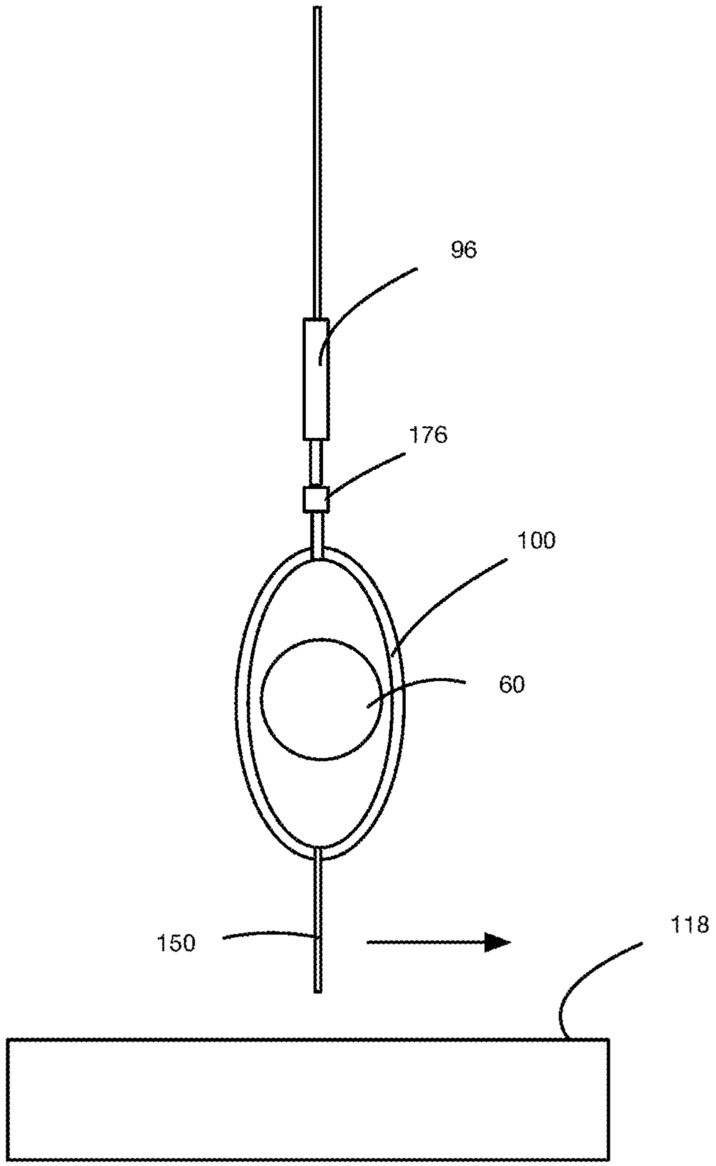

FIGS. 17A and 17B show the patient 60 enveloped in the wrap 100 having been lifted substantially via the cradle 117 of the hoist to elevate the patient 60 above the bed 118. As the patient is enveloped and retained snugly within the wrap 100, which is, in turn, held along its length via adjustable length connector straps 109 by the rigid support bar 176, relative movement of parts of the body of the patient 60 is inhibited, thereby avoiding risk of injury to the patient 60 and to attending healthcare workers. The length of the connector straps 109 can be adjusted to accommodate differently dimensioned persons so that the body of the person is held in a substantially natural and comfortable position. Any medical equipment placed on the head of the patient 60 does not impede use of the apparatus as the head positioned outside of the wrap 100.

Once the patient 60 is elevated above the bed 118, the guide straps 150 can be employed to guide a lower hanging lateral side 119 of the patient 60 to an opposite lateral side of the bed 118 which it previously was not positioned on, or to stabilize the patient's movement. The cradle 117 of the hoist can then be operated to lower the patient 60 until the lower hanging lateral side 119 is positioned just over its desired location on the bed 118.

Returning again to FIG. 13, upon repositioning the lower depending lateral side (e.g., the left lateral side LLS as shown in FIG. 14K), the patient 60 is lowered and the support bar and hoist are decoupled (344). Continued lowering of the cradle 96 causes the lower hanging lateral side 119 of the body of the patient 60 to contact the bed 118 and come to rest in the desired orientation. FIG. 14L shows the patient 60 having been repositioned and lowered so that their left lateral side LLS is now resting on the opposite side of the bed 118. Continued operation of the hoist lowers the cradle 96 and the support bar 176 so that the right lateral side is lowered towards the bed 118 until the patient 60 is resting in a prone position on the bed 118, as shown in FIG. 14M. The lateral portions 124*a*, 124*b* are then uncoupled along an exposed side (348). In particular, in the illustrated example, the posterior edges PE of the lateral portions 124*a*, 124*b* are decoupled by separating the hook-and-loop fabric patches to expose the posterior side of the patient 60. FIG. 14N shows the wrap 100 having been opened along the posterior side of the patient 60.

While the wrap 100 is made of a breathable material, it can be desirable to remove it from underneath the patient 60. If it is desired to remove the wrap 100 from underneath the patient (352), the patient 60 is rolled onto a lateral side (356). FIG. 14O shows the patient being rolled onto their right lateral side RLS. The lateral portion that is uncovered can now be decoupled from the lateral portion that resides under the lateral side of the patient 60 resting on the bed 118 and removed (360). FIG. 14P shows the left lateral portion 124*b* having been removed. Next, the patient 60 is rolled onto their other lateral side (364), as is shown in FIG. 14Q. The other lateral portion of the wrap 100 can now be removed from the bed 118 (368). Upon removal of both lateral portions 124*a*, 124*b* of the wrap 100, the patient 60 can be rested upon the bed 118 (372), as shown in FIG. 14R. In this manner, the patient 60 can be alternated between a supine position and a prone position with little physical effort from attending health care workers.

The wrap 100 can be maintained in place underneath the patient 60 when the patient 60 is not being lifted so that it is ready for a subsequent reorientation of the patient 60 via the hoist.

After decoupling of the support bar 176 to the loops 168, the loops 120 enable the support bar 176 to be coupled thereto and coupled to a lift to enable elevation of the torso of the patient 60 while the patient 60 is in the prone position to facilitate access and assessment of the head and neck of the patient 60 by healthcare workers.

Figure 18:
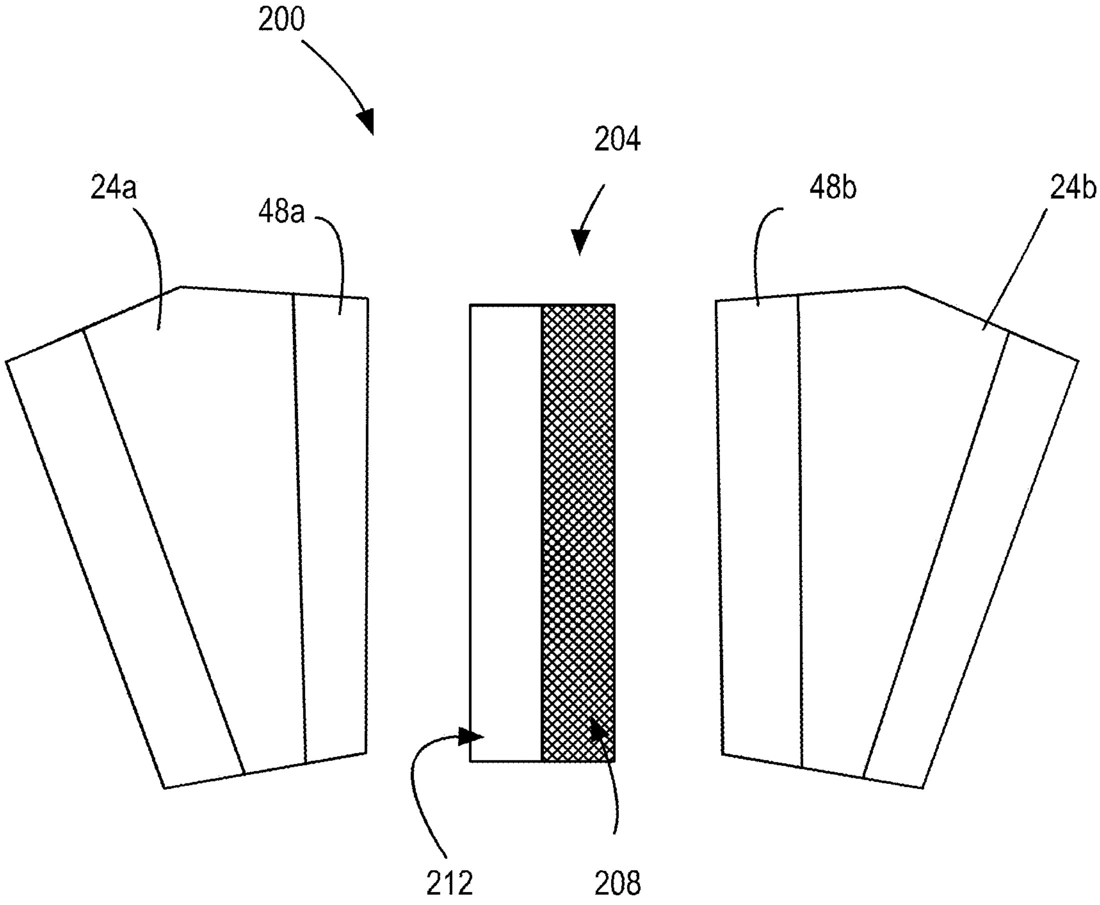
FIG. 18 shows an expansion member for use with the wrap of FIGS. 1 and 2.

FIG. 18 shows a wrap 200 that is similar to the wrap 20 of FIGS. 1 and 2. In this embodiment, two lateral portions 24*a*, 24*b* with fasteners 48*a*, 48*b*, respectively, along their posterior regions can be secured to one another via an extension member 204 that has fasteners in the form of mating hook-and-loop fabric patches 208, 212 complementary to the fasteners 48*a*, 48*b*. In this manner, inclusion or exclusion of the expansion member 204 can allow the size of the wrap 200 to be adjusted according to needs. It will be understood that two or more of the extension members 204 can be employed in series to provide further expansion.

Figure 19:
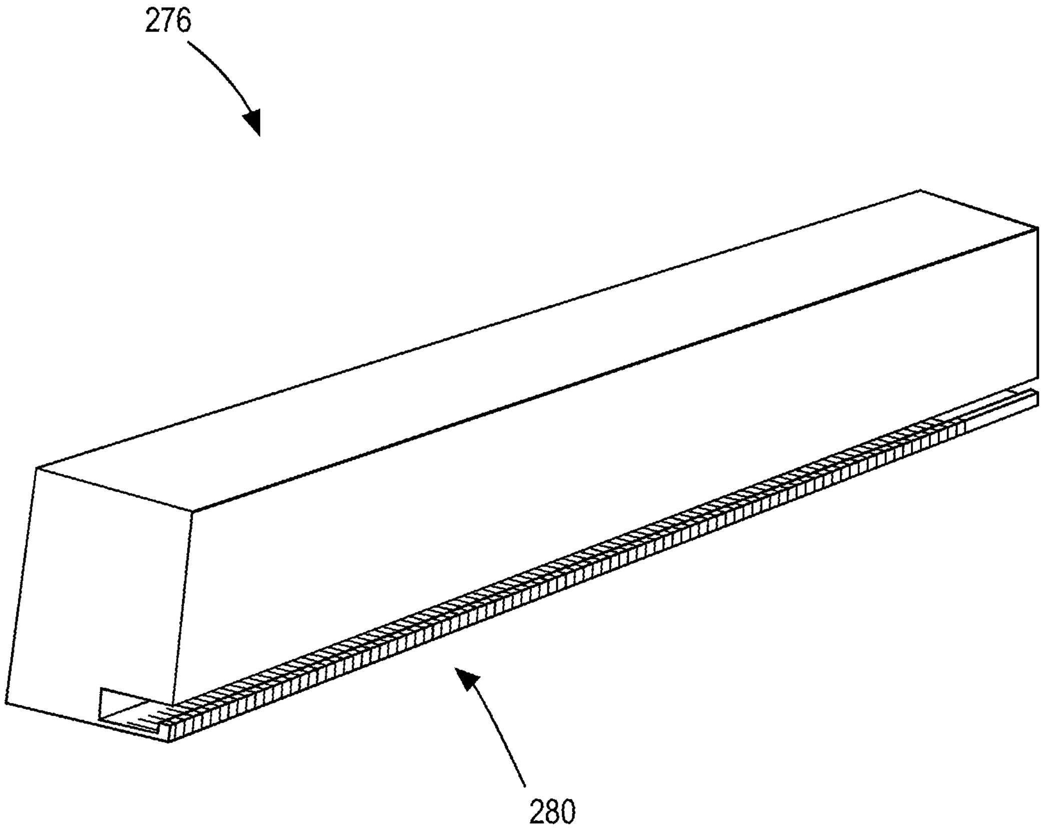
FIG. 19 shows a support bar in accordance with another embodiment.

FIG. 19 shows an incomplete support bar 276 in accordance with another embodiment. The support bar 276 includes an array of hooks 280 that enable loops of a wrap to be secured thereon. As the spacing between adjacent hooks 280 is relatively small, surface friction between the loops of the wrap and the hooks 280 inhibits relative slippage. Connectors for coupling the support bar 276 to a hoist can be positioned along a top surface of the support bar 276.

Figure 20:
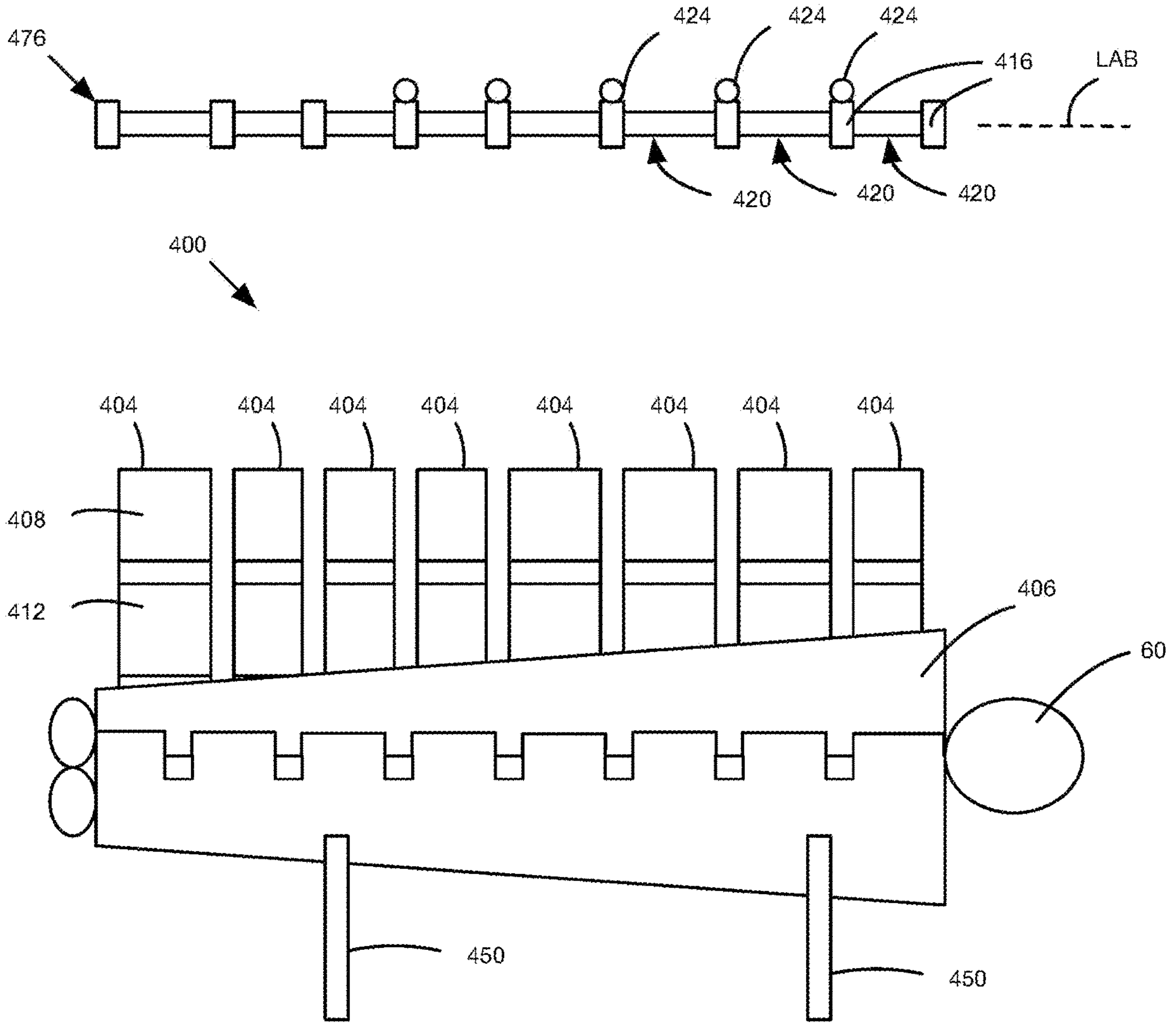
FIG. 20 shows a wrap in accordance with a further embodiment.

FIG. 20 shows an apparatus for reorienting a person in accordance with a further embodiment. In particular, the apparatus includes a wrap 400 that is similar to the wrap 100 of FIGS. 10A to 11B, except that the wrap 400 has a set of connectors in the form of straps 404 that extend from a main panel 406. The straps 404 include complementary mating hook-and-loop fabric patches 408, 412. A corresponding support bar 476 is also shown. The support bar 476 includes a set of enlarged disks 416 that define grooves 420 between them. The support bar 476 can be positioned on the straps 404 when the straps 404 are opened, and the straps 404 can be looped around the support bar 476 and folded over to connect the hook-and-loop fabric patches 408, 412 together to secure the wrap 400 to the support bar 476. The enlarged disks 416 prevent slippage of the straps 404 along a longitudinal axis LA of the support bar 476 when fastened around the support bar 476. Two positioning straps 450 enable a lateral side of the patient 60 hanging downwards to be positioned on a bed. Connector brackets 424 on the support bar 476 enable the support bar 476 to be connected to a hoist. It is contemplated that the straps 404 can then be clamped to further secure the hook-and-loop fabric connections.

While, in the above-described embodiment, the connectors are provided via loops defined by a reinforcement fabric strip stitched to the central region of the lateral portion, various other manners for providing connectors can be employed. In one particular embodiment, fabric strips can be stitched to the central region of the lateral portions so that one or more loops are provided. In another embodiment, apertures in the central region can enable coupling of links to a rigid member to support the person. Here, it can be beneficial to reinforce the material at least around the apertures to inhibit tearing.

It is contemplated that the wrap can be accommodated with heating and/or cooling elements, or could couple to heating and/or cooling devices, to provide temperature control to a person.

The wrap can include or be configured to connect to padding positioned between the person and the wrap to prevent pressure point irritation and/or damage to the skin of the person.

Figure 21A:
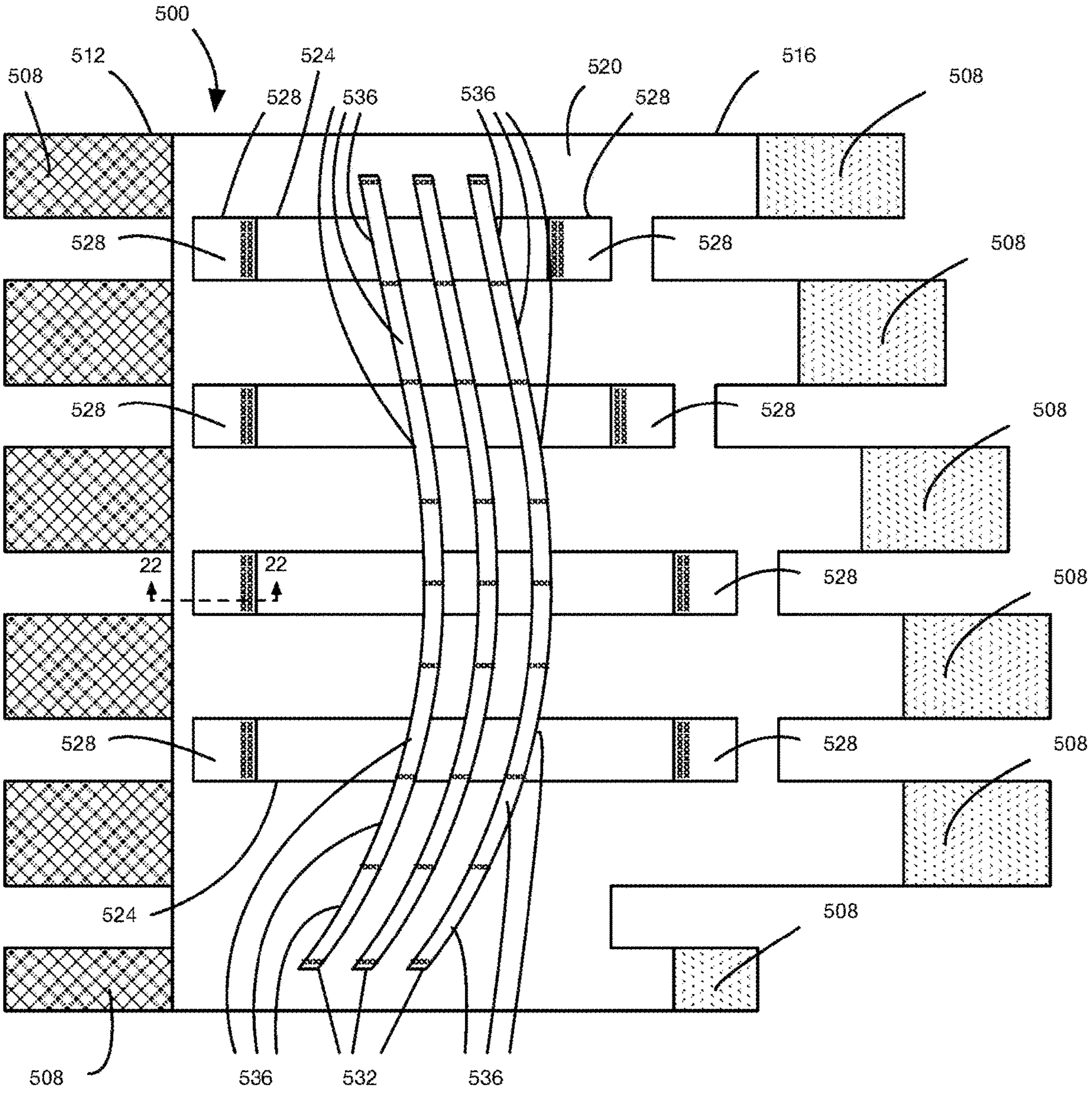
FIGS. 21A and 21B show a right lateral portion and a left lateral portion, respectively, of a wrap in accordance with another embodiment.
Figure 21B:
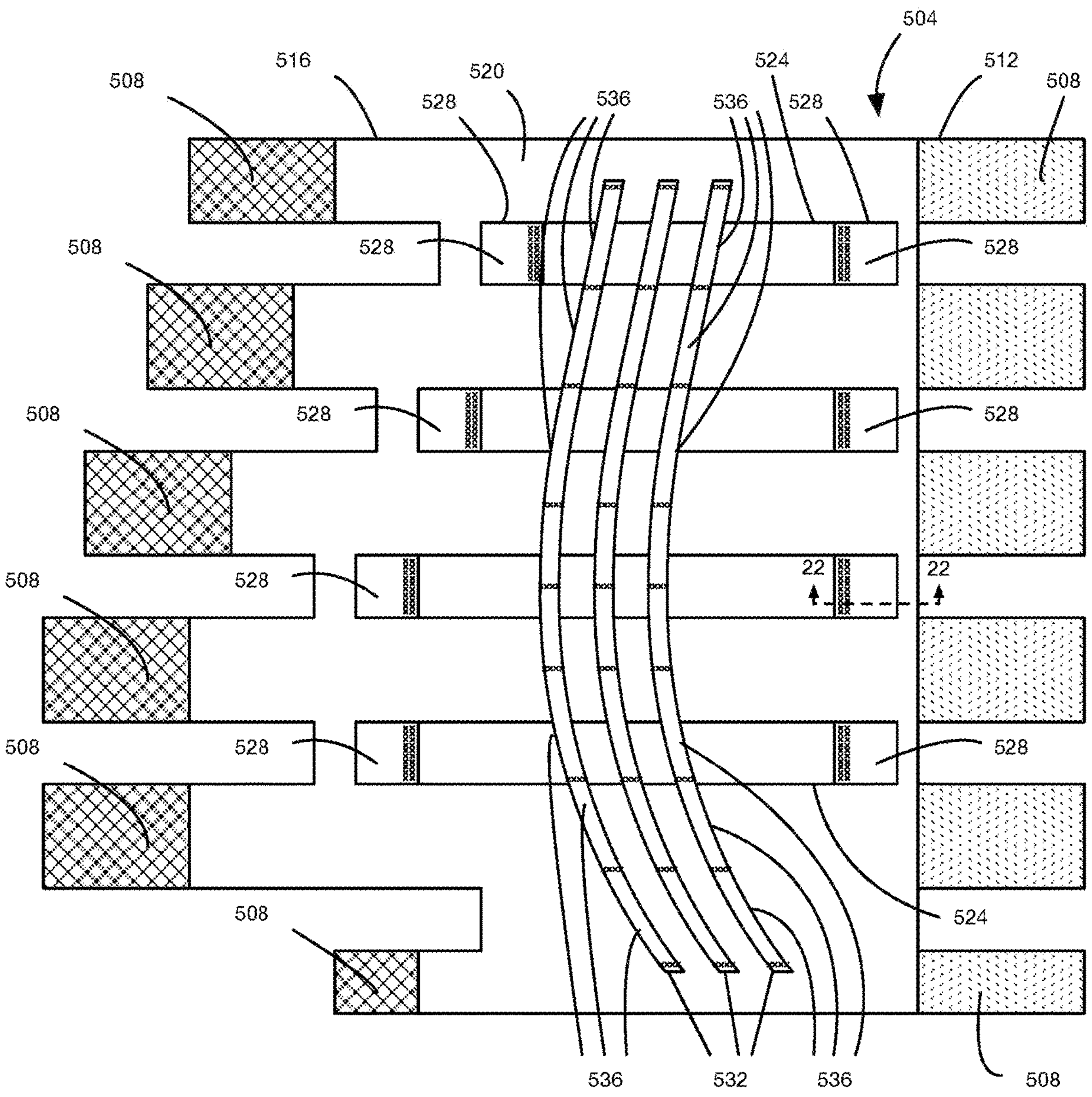

FIGS. 21A and 21B show a right lateral portion 500 and a left lateral portion 504, respectively, of a wrap in accordance with a further embodiment. The right and left lateral portions 500, 504 have fasteners in the form of hook-and-loop fabric patches 508 along posterior straps 512 and anterior straps 516 extending from a main panel 520. The material of the main panel 520 and anterior and posterior straps 512, 516 is sufficiently flexible and has a sufficiently low elasticity so that when the lateral portions 500, 504 of the wrap are secured on by encircling/wrapping around a person via the hook-and-loop fabric patches 508 sufficiently snugly, relative movement of the knees, hips, and shoulders of the person is inhibited. As the posterior straps 512 and anterior straps 516 upon which the hook-and-loop fabric patches 508 are separated, placement of each of the hook-and-loop fabric patches 508 can be adjusted to accommodate differently dimensioned people or different desired snugness.

Figure 22:
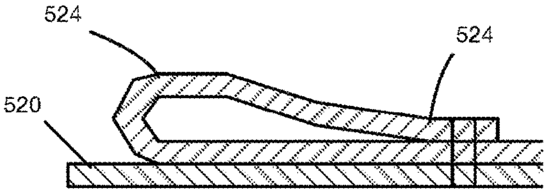
FIG. 22 shows a section view of a lateral support strap forming part of the right lateral portion of the wrap along 22-22 in FIG. 21.

A set of resilient straps 524 are stitched or otherwise fastened onto the main panel 520 and extend laterally along the main panel 520 of each of the right and left lateral portions 500, 504. Each end of each strap 524 is folded back and stitched to provide a connector in the form of a loop 528, as shown in FIG. 22. The connectors 528 are couplable to a support bar via any suitable means to enable lifting of the wrap when secured around a person. In one scenario, straps having carabiners can be coupled to the connectors 528 and to the support bar to support and lift the person enveloped in the wrap.

Three straps 532 extend longitudinally (relative to a person) and parallel to one another. The straps 532 are stitched at various positions to the main panel 520 along their length, defining spans between the stitched positions that are not secured to the main panel 520. These spans serve as handles 536 that enable manual lifting of the person once the person is secured within the wrap. Each strap 532 provides a set of handles 536. When the wrap is secured on a person, it is possible that the wrap can be shifted laterally about the circumference of the person due to misalignments between the person and the wrap when being positioned thereon, as a result of eventual slippage between the person and the wrap, etc. The three sets of handles 536 enable healthcare professionals the ability to select a position from the three sets of handles 536 from which to lift the person. It may be desirable to lift the person from the set of handles closest to the lateral side of the person in many scenarios.

Figure 23:
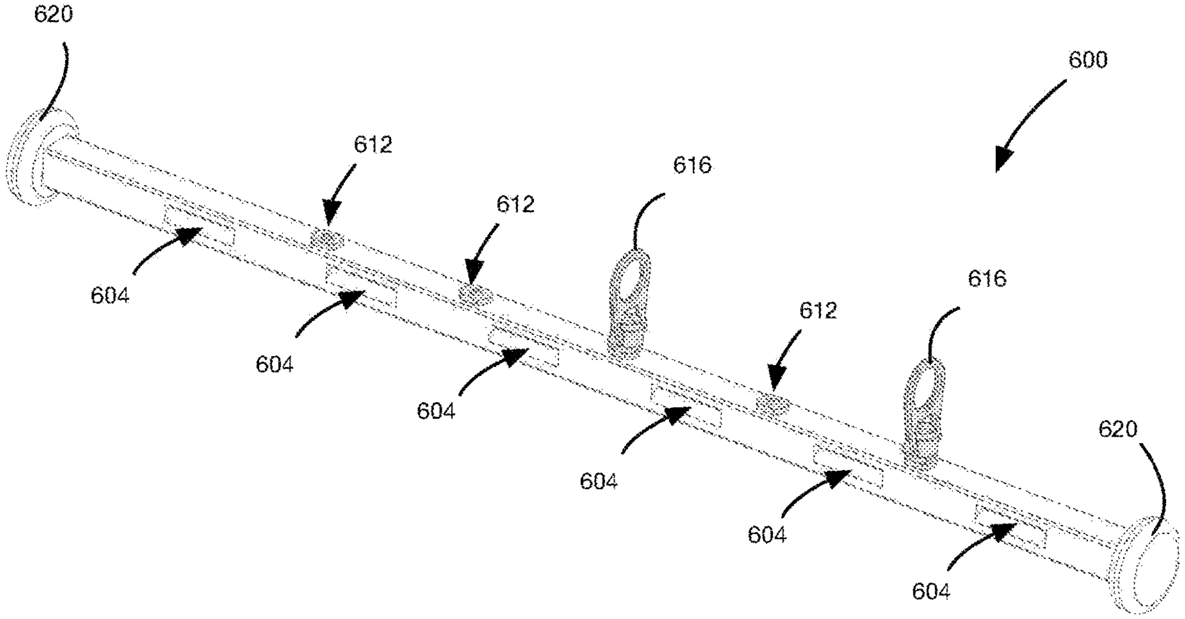
FIG. 23 shows a support bar in accordance with another embodiment.
Figure 24:
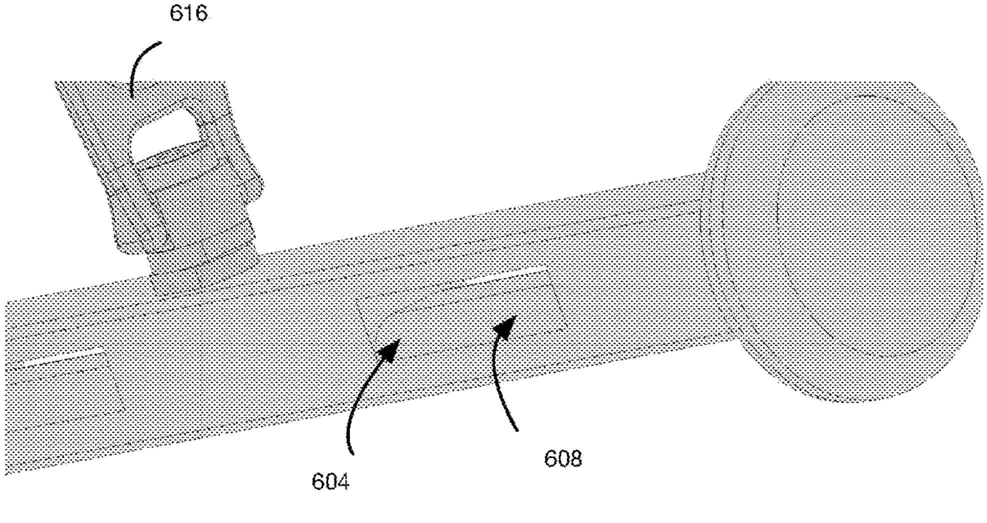
FIG. 24 shows a portion of the support bar of FIG. 23 in greater detail.

FIGS. 23 and 24 show a support structure in the form of a support bar 600 in a further embodiment. The support bar 600 is formed of a single bar of a suitably rigid material such as steel. Each of a set of connectors 604 in the form of through holes that extend laterally through the support bar 600 is dimensioned and aligned with a corresponding one of a set of straps to receive and support the strap to secure a wrap securing a person. The through holes 604 have rounded edges 608 to reduce fraying of the straps extending from the wrap as the straps shift within the through holes 604. A set of connectors in the form of clip apertures 612 in which push clips 616 can be releasably secured. The push clips 616 are couplable to a hoist to enable lifting of a person secured within a wrap that is secured to the support bar 600 via straps. The push clips 616 can be selectively positioned in any two of the five clip apertures 612 to control the positioning of the weight of the person relative to the connection point to the hoist. The distribution of weight of persons can vary. Some people are more top heavy, and others are more bottom heavy. By enabling the support bar 600 to be connected to the hoist at a number of positions longitudinally along the bar (which itself extends longitudinally along the length of the person from head to toe), the hoist can be connected closer to the center of mass of the person to avoid significant listing of the person, which can pose a risk of injury to both the person and the healthcare workers attending to the person. A pair of compressible bumpers 620 are positioned over the longitudinal ends of the support bar 600 to mitigate damage to the ends of the support bar 600, the person, and the healthcare workers. The bumpers 620 can be removed prior to sanitization of the support bar.

Figure 25A:
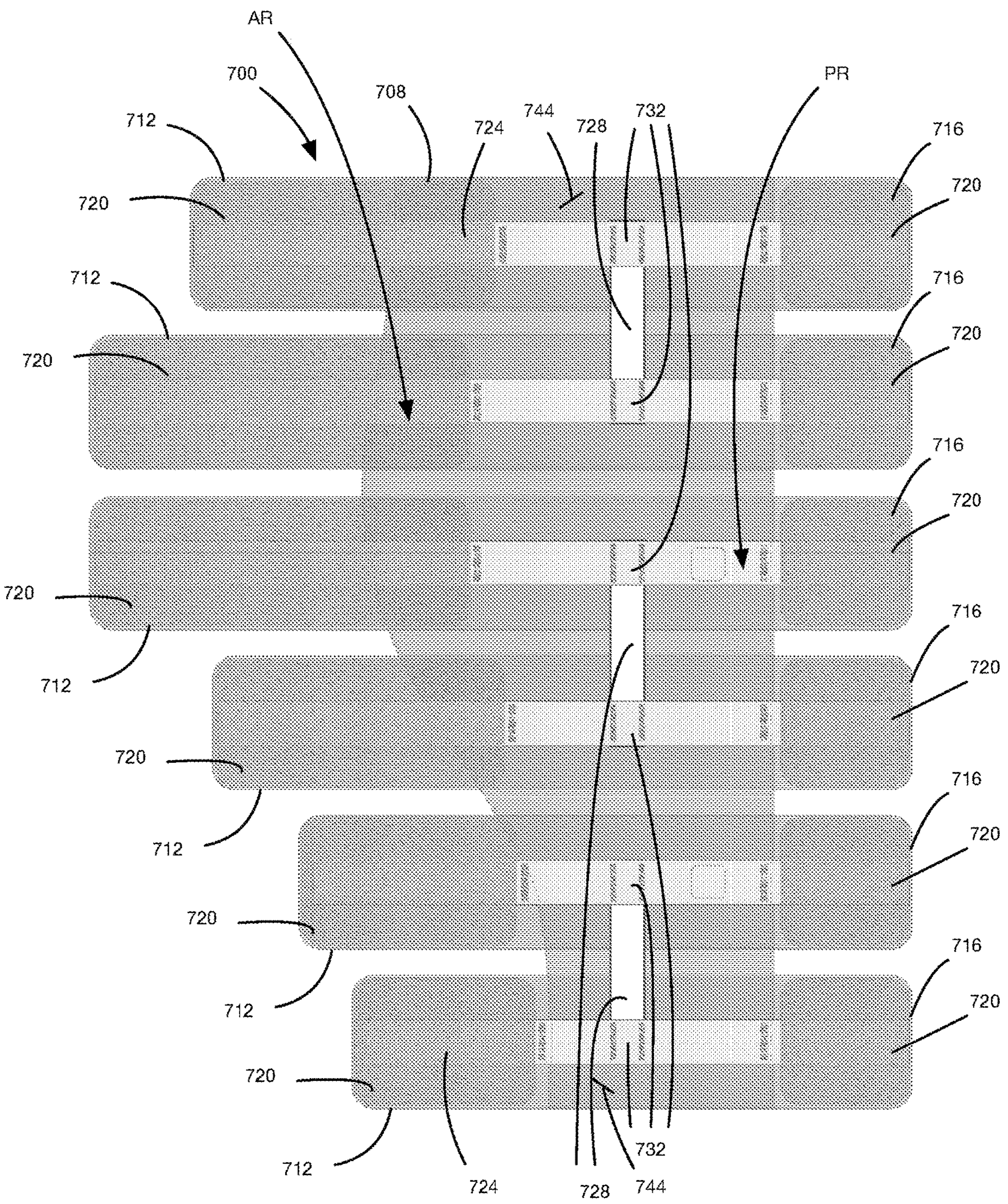
FIG. 25A shows a left lateral portion of a wrap in accordance with another embodiment.
Figure 25B:
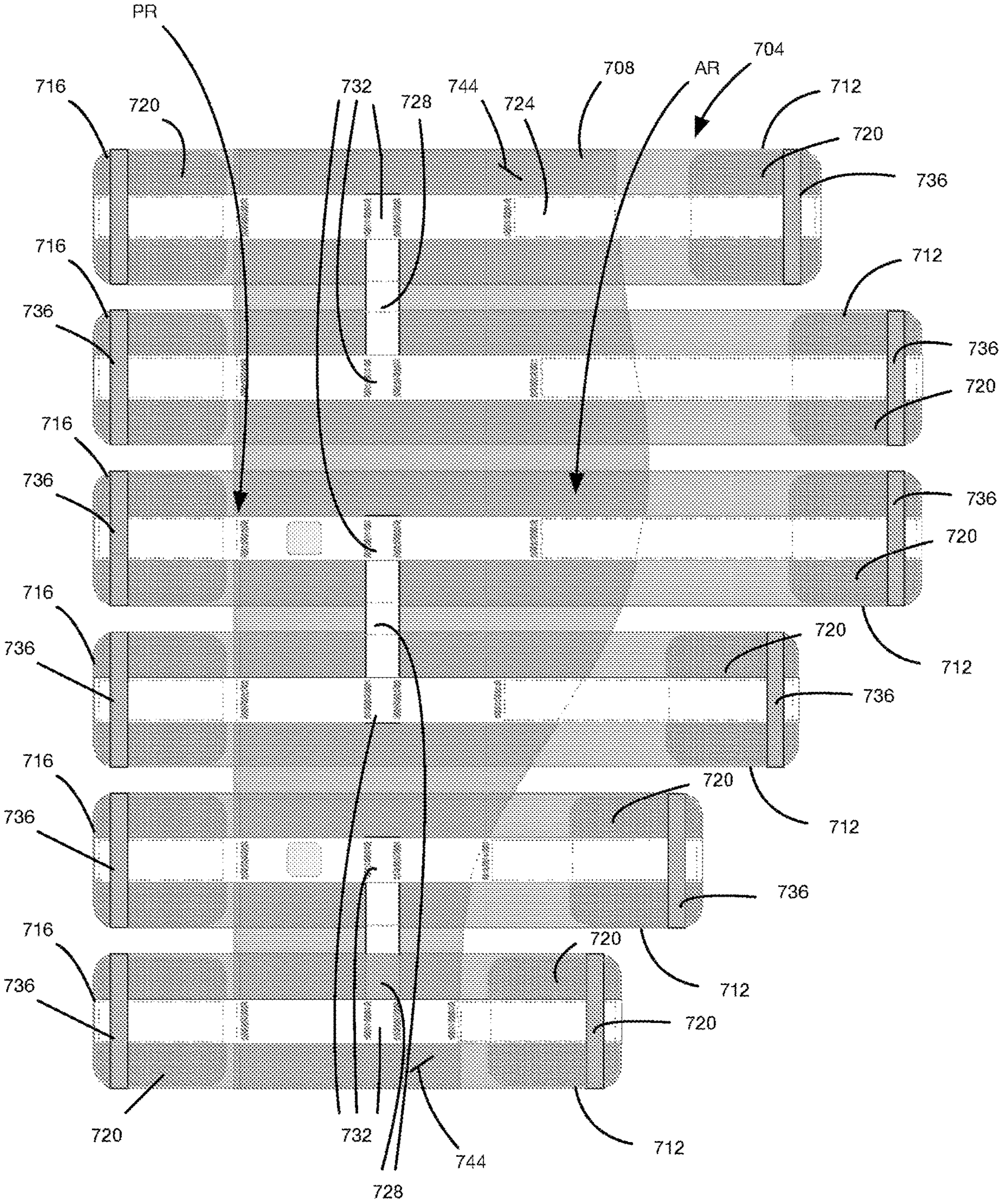
FIG. 25B shows a right lateral portion of a wrap in accordance with another embodiment.

A left lateral portion 700 and a right lateral portion 704 of a wrap in accordance with another embodiment are shown in FIGS. 25A and 25B. The outer surface of each of the lateral portions 700, 704 is shown having a main panel 708 with a set of anterior straps 712 and a set of posterior straps 716. Fasteners in the form of hook-and-loop fabric patches 720 are located towards the anterior edges of the anterior straps 712 in an anterior region AR of the left lateral portion 700 and the right lateral portion 704, and towards the posterior edges of the posterior straps 716 in a posterior region PR of the left lateral portion 700 and the right lateral portion 704. The hook-and-loop fabric patches 720 of the lateral portions 700, 704 are selected so that they mate in an anterior region and a posterior region of the wrap. As the anterior straps 712 and posterior straps 716 upon which the hook-and-loop fabric patches 720 are separated, placement of each of the hook-and-loop fabric patches 720 can be adjusted to accommodate differently dimensioned people or different desired snugness.

The anterior regions AR of the lateral portions 700, 704 form the anterior region of the wrap, and the posterior regions PR of the lateral portions 700, 704 form the posterior region of the wrap. Preferably, the hook-and-loop fabric is selected to provide sufficient resistance to separation via shearing forces. Reinforcement straps 724 are stitched along the lateral portions between the remote ends of the anterior straps 712 and the posterior straps 716. Strips of a strong, flexible material span the reinforcement straps 724 and are stitched thereunder, running parallel to the longitudinal axis of the patient 60. The strips are sufficiently long to enable healthcare workers to grasp the handles 728 to at least partially elevate the patient 60. The reinforcement straps 724 are stitched to provide a gather at the intersections with the handle-forming straps to provide connectors in the form of loops 732. A strip of flexible, resilient material spans across the outside surface of the end of each anterior and posterior strap 712 of the right lateral portion 704 to provide pull tabs 736 that assist a user to pull open the edge of the wrap.

Figure 26:
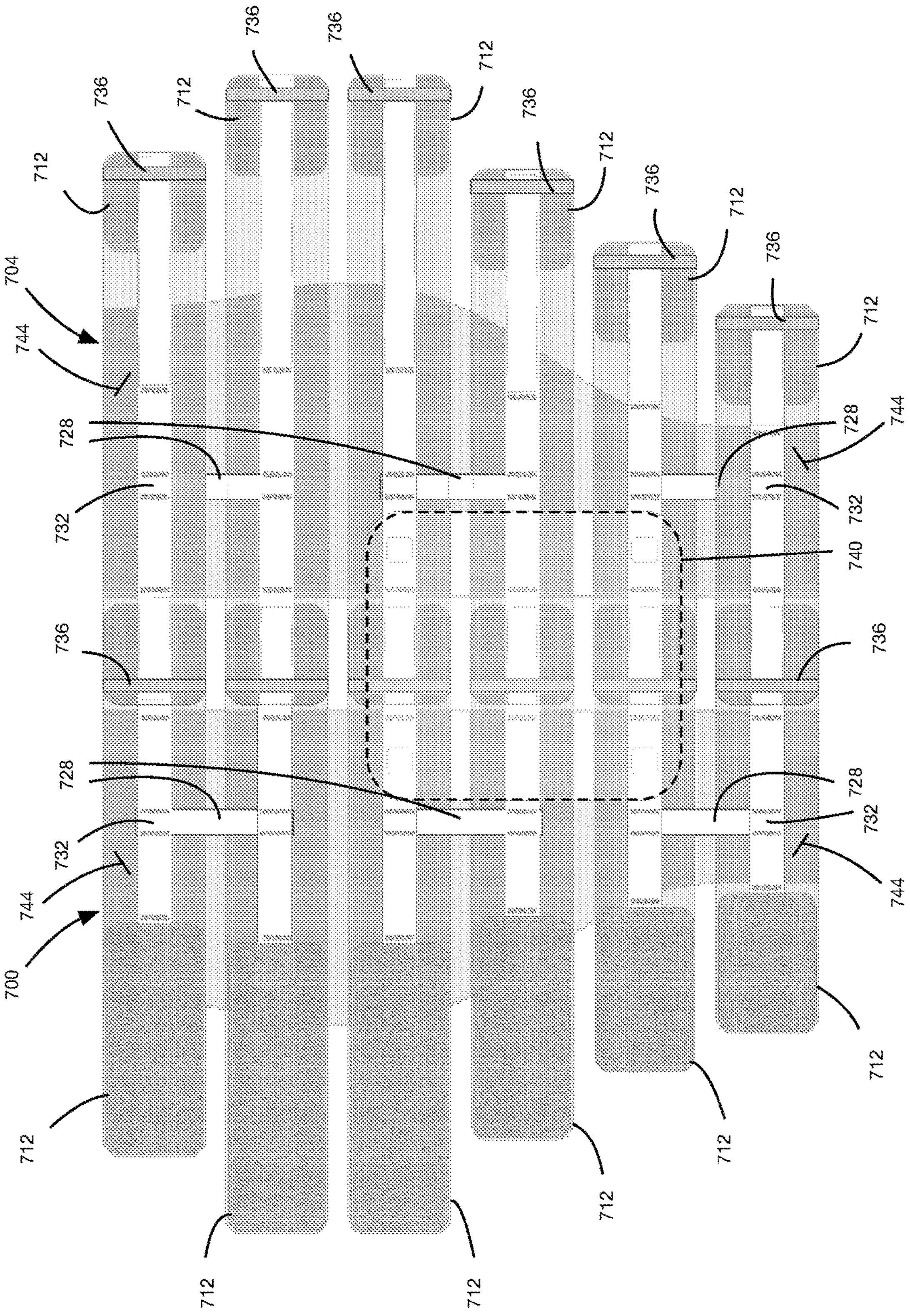
FIG. 26 shows the left lateral portion of FIG. 25A and the right lateral portion of FIG. 25B joined together along a posterior joint to form the wrap.

Now referring to FIG. 26, the left lateral portion 700 and the right lateral portion 704 are shown secured together along the posterior region via the hook-and-loop fabric patches 720 to form the wrap. An absorbent pad 740 is releasably securable on an inside surface of the posterior region of the wrap to protect the wrap from being soiled. A set of eyelets 744 are dimensioned to receive securing tethers that extend from a bed to secure the wrap to the bed when opened. In this manner, the risk of shifting of the wrap relative to the bed, and thus the risk of accidental slippage of a patient lying on top of the wrap, can be reduced. Other designs to perform the function of securing the opened wrap at a position on the bed can be employed.

Figure 27:
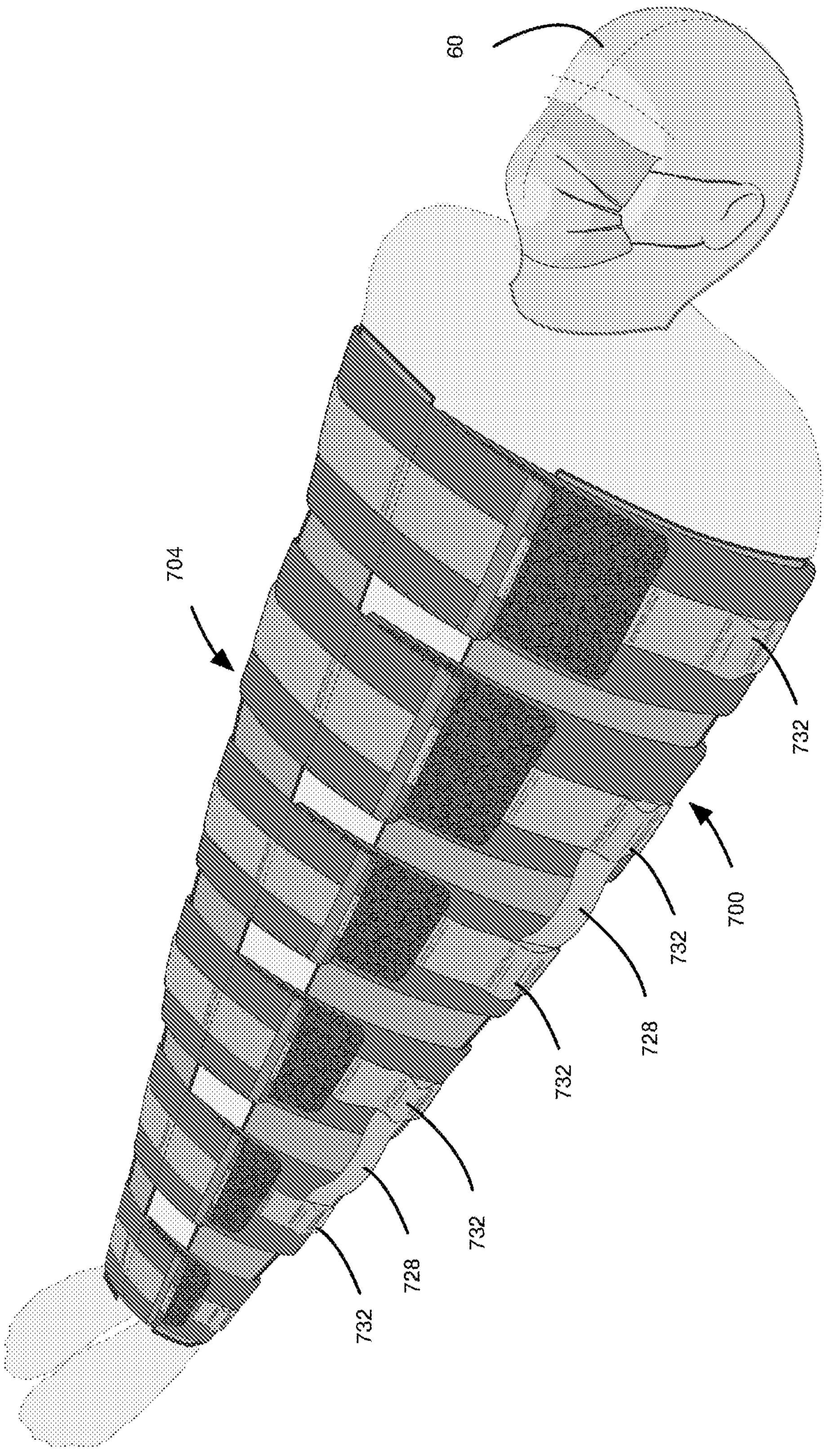
FIG. 27 shows a patient retained within the wrap of FIGS. 25A to 26.

FIG. 27 shows the wrap of FIG. 26 after being secured to a patient 60. The left and right lateral portions 700, 704 are positioned on the patient 60 as described hereinabove with respect to the wrap 100 of FIGS. 10A to 13.

Figure 28A:
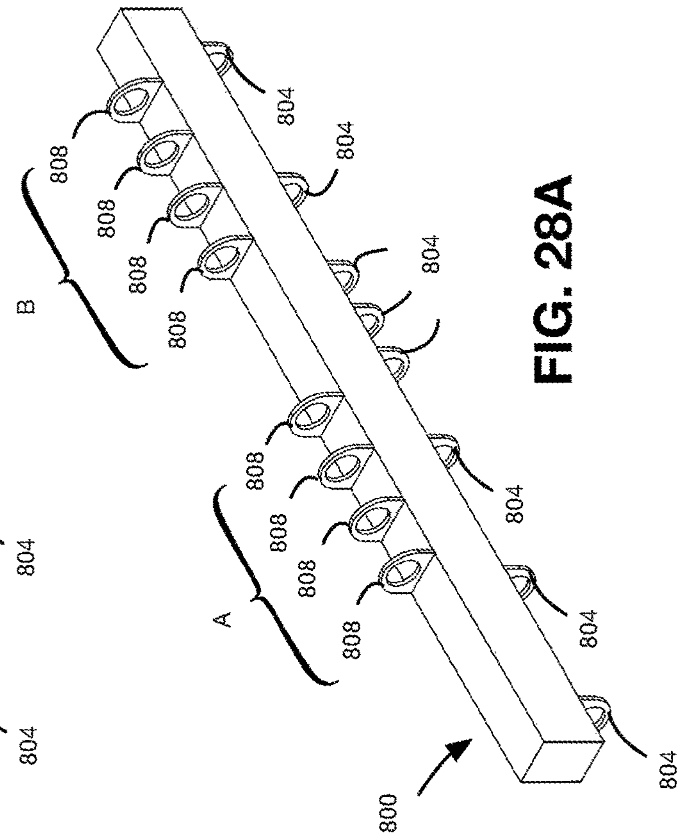
FIGS. 28A to 28C are perspective, front elevation, and side elevation views of a support bar for use with the wrap of FIGS. 25A to 27.
Figure 28B:
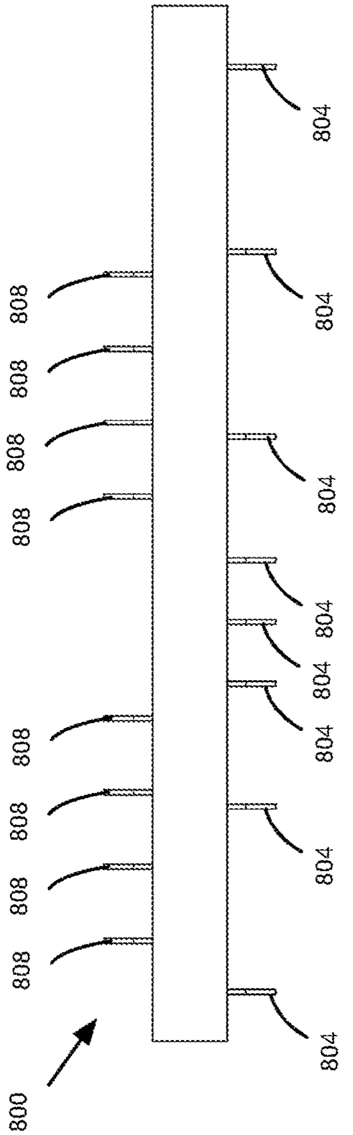
Figure 28C:
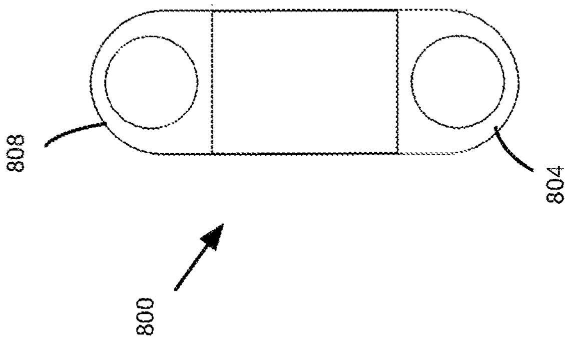

FIGS. 28A to 28C show a support bar 800 in accordance with still yet another embodiment. The support bar 800 can be made of any suitably rigid material for supporting a person when enveloped in the wrap of FIGS. 25A to 27. The support bar 800 includes a set of connecters 804 positioned along a bottom surface for connecting to the wrap. Along a top surface is positioned a set of hoist connectors 808 for coupling the support bar 800 to a hoist. The set of hoist connectors 808 enable the hoist to be coupled to the support bar 800 at a variety of positions along the longitudinal axis of the person. In the particular embodiment, a cradle of a hoist is connected to a hoist connector in a first subset A and to a corresponding hoist connector in a second subset B. As there are four hoist connectors 808 in each subset, there are four positions at which the hoist cradle can be connected to the support bar 800.

Figure 29:
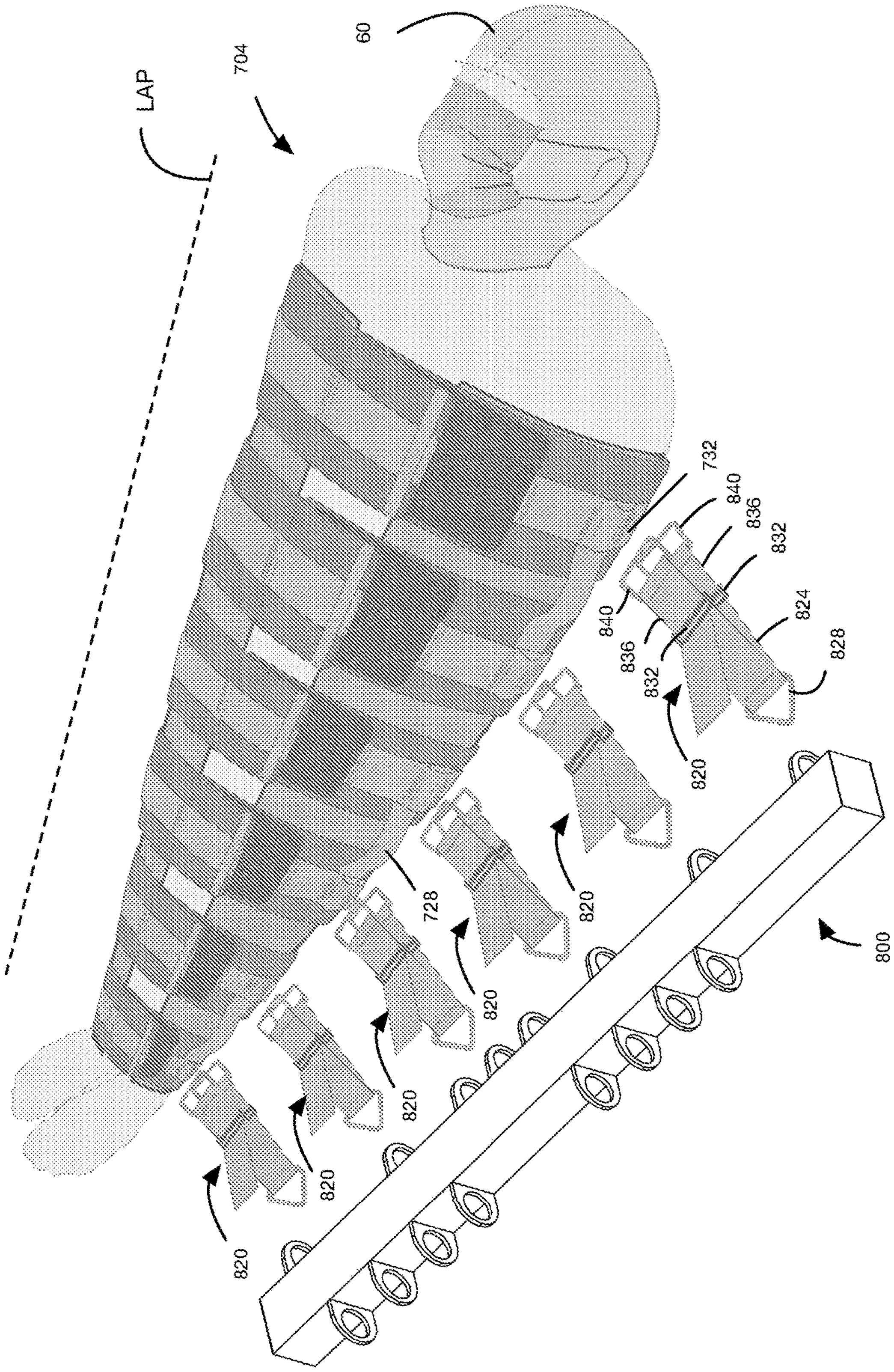
FIG. 29 shows the support bar of FIGS. 28A to 28C positioned adjacent to the left lateral side of the patient retained in the wrap of FIG. 27 with a set of hooking straps positioned between the support bar and connectors along the left lateral side of the patient.

FIG. 29 shows the support bar 800 being coupled to the wrap via a set of composite connector straps 820. Each composite connector strap 820 includes a center strap 824 secured at its center to a triangle carabiner 828. Each end of the center strap 824 is secured to a ladder lock 832. An adjustable strap 836 is passed through each ladder lock 832, enabling easy adjustment of a length of the adjustable strap 836 between the ladder lock 832 and a D-shaped carabiner 840 that is couplable to the loops 732 of the wrap. In this manner, the alignment of the body of the patient 60 can be adjusted for differently dimensioned patients to hold the person in a natural and comfortable position when elevated in the wrap.

When it is desired to lift the person from a lateral side, one of the adjustable straps 836 of each of the composite connector straps 820 can be connected to the loops 732 along the lateral side of the person, and the other adjustable strap 836 is left free. The triangle carabiner 828 is coupled to a corresponding connector 804, and a hoist cradle is coupled to two of the hoist connectors 808. Alternatively, if the person is to be lifted either in a prone or supine position, the adjustable straps 836 of each composite connector strap 820 are coupled to the loops 732 of opposing lateral sides. The lengths of the adjustable straps 836 can be adjusted as desired to support the person in a desired alignment.

Figure 30:
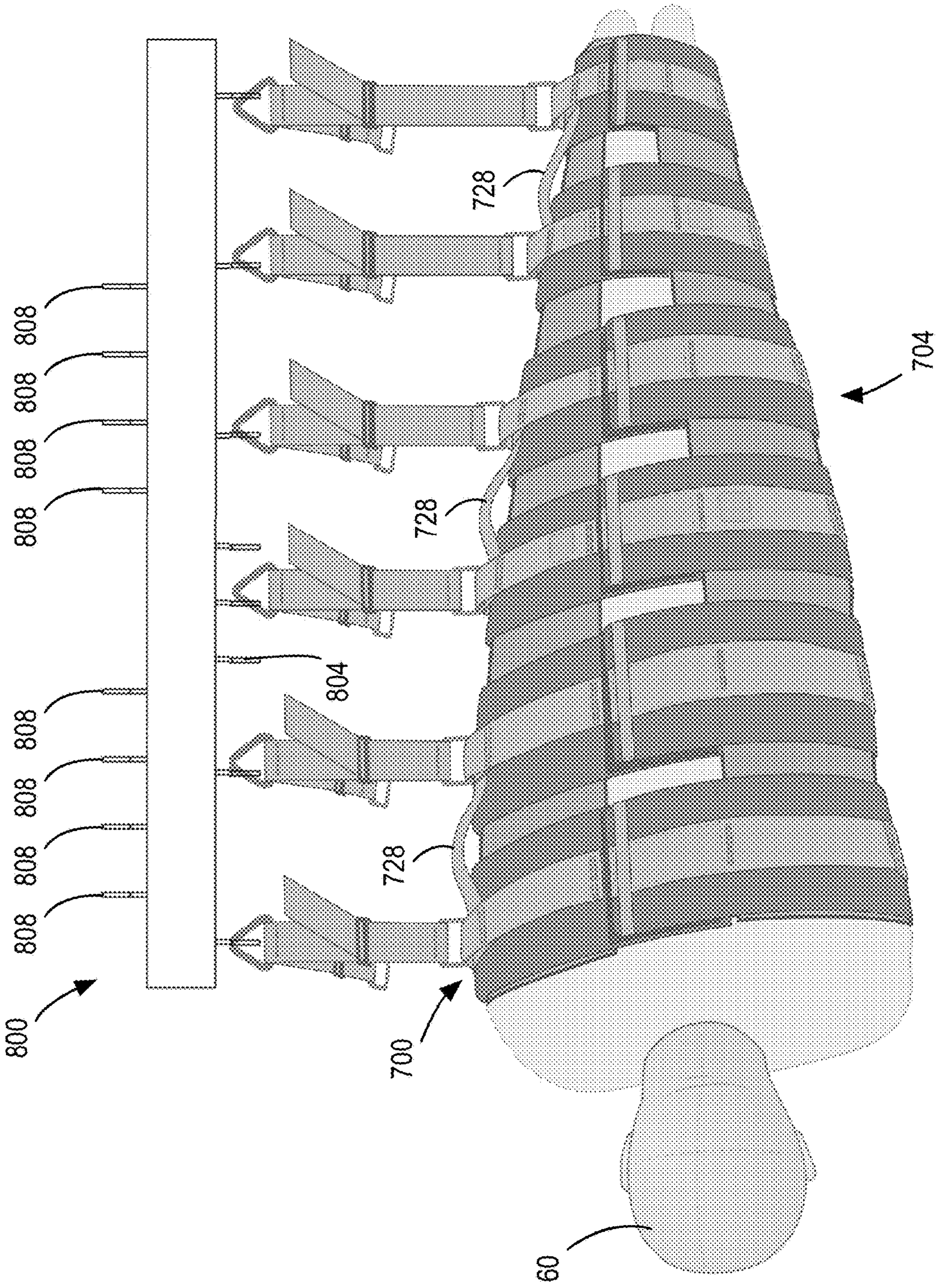
FIG. 30 shows the hooking straps coupled to the connectors of the wrap of FIG. 27 positioned to be coupled to the support bar of FIGS. 28A to 28C.

FIG. 30 shows the person suspended from a lateral side via the wrap. The materials of the lateral portions 700, 704 are sufficiently flexible to enable the wrap to snugly encircle or wrap around the patient 60 to inhibit relative movement of the knees, hips, and shoulders, while still being quite comfortable. When the support bar 800 is coupled to the wrap, and the lengths of the adjustable straps 836 have been adjusted, relative longitudinal movement of the knees, hips, and shoulders can be further inhibited. The reduction in mobility when the patient 60 is suspended in this manner reduces the risk of injury for both the patient 60 and any healthcare workers attending to the patient 60.

Figure 31A:
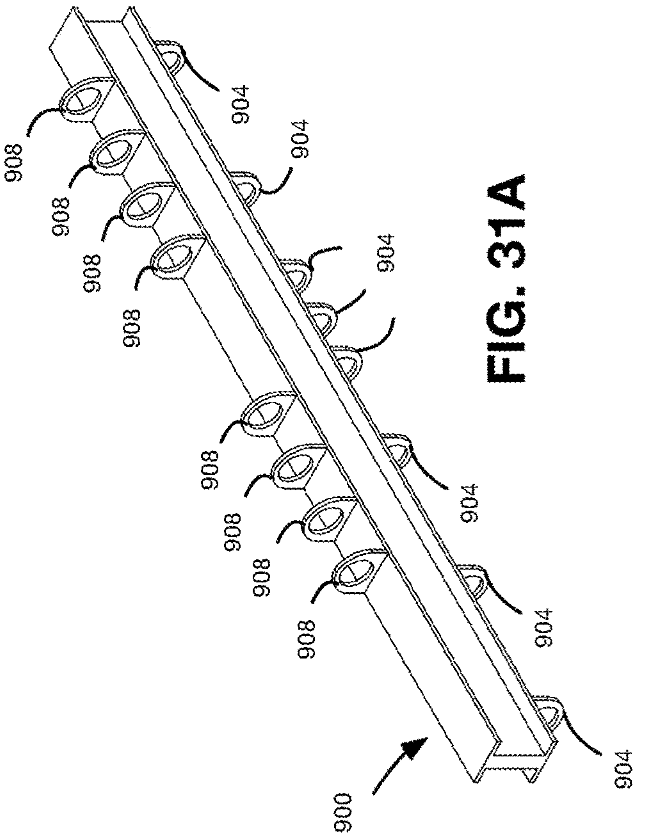
FIGS. 31A to 31C are perspective, front elevation, and side elevation views of a support bar for use with the wrap of FIGS. 25A to 27 in accordance with another embodiment.
Figure 31B:
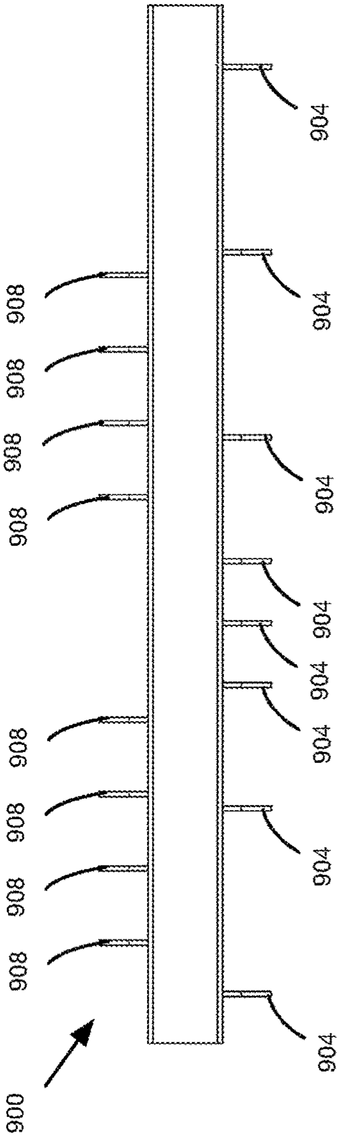
Figure 31C:
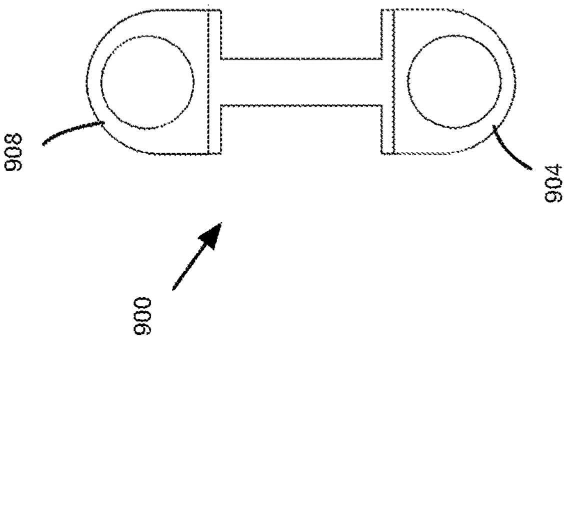

FIGS. 31A to 31C show a support bar 900 in accordance with still further embodiment. The support bar 900 is similar to the support bar 800 of FIGS. 28A to 28C, except that the support bar 900 has an I beam cross section instead of being a solid bar with a rectangular cross-section. The support bar 900 includes a set of connecters 904 positioned along a bottom surface for connecting to the wrap. Along a top surface is positioned a set of hoist connectors 908 for coupling the support bar 900 to a hoist. The set of hoist connectors 908 enable the hoist to be coupled to the support bar 900 at a variety of positions along the longitudinal axis of the person. In the particular embodiment, a cradle of a hoist is connected to a hoist connector in a first subset A and to a corresponding hoist connector in a second subset B. As there are four hoist connectors 908 in each subset, there are four positions at which the hoist cradle can be connected to the support bar 900.

Figure 32:
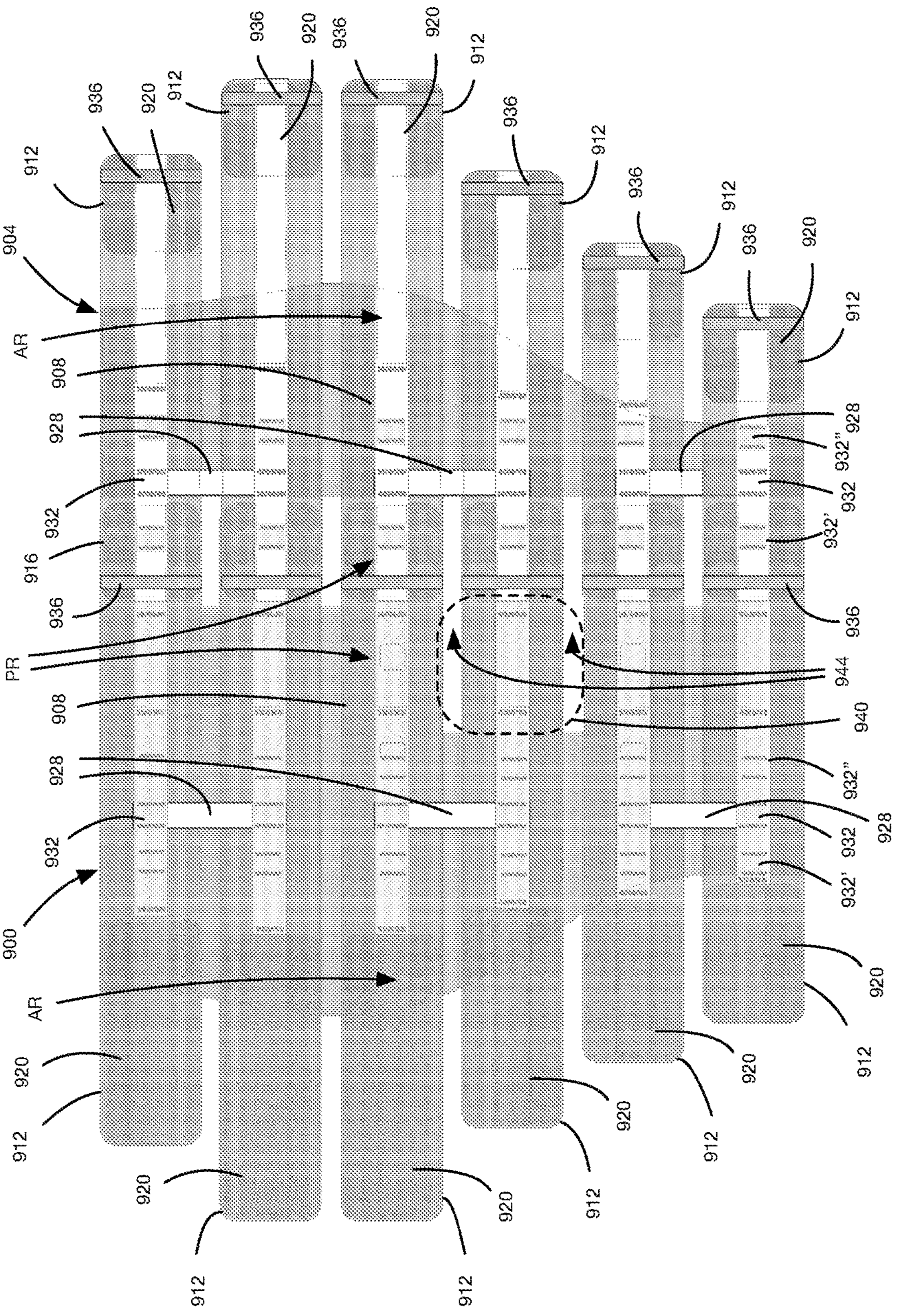
FIG. 32 shows a wrap in accordance with yet another embodiment, wherein a left lateral portion and a right lateral portion of the wrap meet at a posterior joint.

FIG. 32 shows a wrap in accordance with still yet another embodiment. The wrap includes a left lateral portion 900 and a right lateral portion 904. The outer surface of each of the lateral portions 900, 904 is shown having a main panel 908 with a set of anterior straps 912 and a set of posterior straps 916. Fasteners in the form of hook-and-loop fabric patches 920 are located towards the remote ends of the anterior straps 912 in an anterior region AR of the left lateral portion 900 and the right lateral portion 904, and the posterior straps 916 in a posterior region PR of the left lateral portion 900 and the right lateral portion 904. The hook-and-loop fabric patches 920 of the lateral portions 900, 904 are selected so that they mate in the anterior region and the posterior region of the wrap. In this illustrated embodiment, the left lateral portion 900 extends further towards the right lateral side along the posterior region of the wrap. The anterior regions AR of the lateral portions 900, 904 form the anterior region of the wrap, and the posterior regions PR of the lateral portions 900, 904 form the posterior region of the wrap. Preferably, the hook-and-loop fabric is selected to provide sufficient resistance to separation via shearing forces. Reinforcement straps 924 are stitched along the lateral portions between the remote ends of the anterior straps 912 and the posterior straps 916. Strips of a strong, flexible material span the reinforcement straps 924 and are stitched thereunder, running parallel to the longitudinal axis of the patient 60. The strips are sufficiently long to enable healthcare workers to grasp the handles 928 to at least partially elevate the patient 60. The reinforcement straps 924 are stitched to provide a gather at the intersections with the handle-forming straps to provide connectors in the form of loops 932. In addition, additional gathers of the reinforcement straps are formed via stitching to provide additional loops 932', 932" acting as connectors. Each of the sets of connectors 932, 932', and 932" extend longitudinally along the wrap. When coupling the wrap to a support bar/hoist, any of the three sets of connectors 932, 932', 932" can be employed. A strip of flexible, resilient material spans across the outside surface of the end of each anterior and posterior strap 912 of the right lateral portion 904 to provide pull tabs 936. An absorbent pad 940 is releasably securable on an inside surface of the posterior region of the wrap to protect the wrap from being soiled. Two discontinuities in the left lateral portion 900 on either side of one of the posterior straps 916 enable opening of the strap 916 to access and replace the absorbent pad 940 when soiled without fully opening the posterior side of the wrap.

It is contemplated that the dimensions of the wraps illustrated and described herein will accommodate a range of sizes of person, and that a set of sizes of the wrap can be provided to accommodate a set of ranges of sizes of people.

In some embodiments, the wrap can be made as an integral item. In such scenarios, it can be desirable to provide one or more openings along a posterior surface of the wrap to provide access to the posterior of a person when the person is prone.

It will be appreciated that the process or reorienting a person from supine to prone as described above readily applies in the same general manner to the reorientation of a person from prone to supine.

In the above embodiments, the anterior and posterior edges of the lateral portions overlap, but, in other embodiments, the anterior and posterior edges of the lateral portions may not necessarily overlap. Further, the anterior and posterior joints between the lateral portions of the wrap can be configured to be positioned anywhere between the lateral sides of a person so that one of the lateral portions can be secured and unsecured when the person is on one lateral side of their body.

Preferably, the anterior and posterior regions of the wrap are relatively flat and do not have elements that, when lain upon by a person, could create pressure points on their skin.

While, in the above-described embodiments, the support structures/bars have been rigid, other materials for the support structures can be selected that are generally inflexible to inhibit relative movement of the knees, hips, and shoulders of a person secured in a wrap and connected to the support structure at points along the span between the person's knees and shoulders.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. An apparatus for reorienting a person between a supine position and a prone position, comprising:

a wrap having a first lateral portion and a second lateral portion, each of the first lateral portion and the second lateral portion having a posterior edge and an anterior edge opposite the posterior edge and being dimensioned to extend from an anterior region and around to a posterior region of a person from at least from below the knees of the person to above the elbows of the person, each of the first lateral portion and the second lateral portion being substantially flexible in the region extending from the anterior edge and in the region extending from the posterior edge;

a first set of fasteners for releasably securing the first lateral portion and the second lateral portion together towards the posterior edges thereof, each of the first set of fasteners being dimensioned to extend at most partway across from the posterior edges of the first lateral portion and the second lateral portion towards one of the lateral sides of the person;

a second set of fasteners for releasably securing the first lateral portion and the second lateral portion together towards the anterior edges thereof, each of the second set of fasteners being dimensioned to extend at most partway across from the anterior edges of the first lateral portion and the second lateral portion towards one of the lateral sides of the person, the wrap extending around and snugly retaining the person therein when the first and second sets of fasteners are secured; and a set of connectors along at least one of the first lateral portion and the second lateral portion extending from the knees or below the knees to the elbows or above the elbows of the person and being located towards a corresponding one of the lateral sides of the person when the person is retained in the wrap, the set of connectors being couplable to a hoist for lifting the wrap and the person retained in the wrap to reorient the person between the supine position and the prone position on a surface, wherein, in the supine position, the second set of fasteners are openable to expose the anterior region of the person, and wherein, in the prone position, the first set of fasteners are openable to expose the posterior region of the person.

2. The apparatus of claim 1, wherein the set of connectors includes loops.

3. The apparatus of claim 1, further comprising a support structure coupled or couplable to a hoist and to the set of connectors to inhibit relative movement of the knees, hips, and shoulders of the person when secured in the wrap and coupled to the hoist.

4. The apparatus of claim 3, wherein the support structure has a set of wrap connectors for coupling to the set of connectors of the wrap retaining a person along a longitudinal axis of the person, the support structure having a set of hoist connectors dimensioned to be couplable to a hoist, the set of hoist connectors enabling coupling of the hoist to the support structure at at least two positions along the longitudinal axis.

5. The apparatus of claim 4, wherein the support structure is inflexible to bowing towards the person-retaining structure.

6. The apparatus of claim 5, wherein the support structure is a rigid member.

7. The apparatus of claim 1, wherein the set of connectors is a first set of connectors along one of the first lateral portion and the second lateral portion, and wherein a second set of connectors is positioned along an opposite one of the first lateral portion and the second lateral portion extending from the knees or below the knees to the elbows or above the elbows of the person and being located towards another corresponding one of the lateral sides of the person when the person is retained in the wrap, the set of connectors being couplable to a hoist for lifting the wrap and the person retained in the wrap.

8. The apparatus of claim 1, further comprising an expansion portion that is positionable between the anterior edges of the first and second lateral portions or between the posterior edges of the first and second lateral portions to enlarge the wrap.

9. The apparatus of claim 1, wherein at least one of the first lateral portion and the second lateral portion includes a set of handles positioned towards midway between the posterior edge and the anterior edge along at least one of the first lateral portion and the second lateral portion.

10. The apparatus of claim 9, the set of handles is a first set of handles positioned along the first lateral portion, and wherein a second set of handles is positioned along the second lateral portion and located towards midway between the posterior edge and the anterior edge of the second lateral portion.

11. The apparatus of claim 1, wherein at least one of the first lateral portion and the second lateral portion includes a flap that is openable to expose a section of the posterior region of the person while the wrap remains secured thereon.

12. A method for reorienting a person from a supine position to a prone position, comprising:

securing a wrap around a person via a set of releasably securable fasteners, the wrap having substantially flexible anterior and posterior regions positioned on anterior and posterior regions of the person, respectively, when the wrap is secured on the person, the wrap extending around and snugly retaining the person therein when the set of releasably securable fasteners are secured, the wrap having a set of connectors being located towards a corresponding one of the lateral sides of the person when the person is retained in the wrap;

coupling a hoist to the set of connectors;

at least partially elevating the person from the supine position on a surface with the hoist;

laterally shifting the hoist to reposition the person;

lowering the person into the prone position on the surface; and opening the set of releasably securable fasteners to expose the posterior region of the person.

13. The method of claim 12, wherein the wrap is dimensioned to extend from at least from below the knees of the person to above the elbows of the person.

14. The method of claim 12, wherein the at least partially elevating the person comprises fully elevating the person off of the surface.

15. The method of claim 12, wherein the coupling comprises:

coupling the hoist to a support structure that is rigid; and coupling the support structure to the set of connectors.

16. A method for reorienting a person from a supine position to a prone position, comprising:

securing a wrap on the person via a set of releasably securable fasteners;

securing a hoist to a set of connectors positioned on the wrap towards one of the lateral sides of the person when the person is retained in the wrap;

at least partially elevating the person with the hoist from the supine position on a surface;

laterally shifting the hoist to reposition the person; and lowering the person into the prone position on the surface.

17. The method of claim 16, wherein the wrap is dimensioned to extend from at least from below the knees of the person to above the elbows of the person.

18. The method of claim 16, wherein the at least partially elevating the person comprises fully elevating the person off of the surface.

19. The method of claim 16, wherein securing the hoist comprises:

coupling the hoist to a support structure that is rigid; and coupling the support structure to the set of connectors.

20. The method of claim 16, further comprising opening the set of releasably securable fasteners to expose a posterior region of the person.

* * * * *